(12) United States Patent
De Atley

(10) Patent No.: US 8,977,294 B2
(45) Date of Patent: Mar. 10, 2015

(54) SECURELY LOCATING A DEVICE

(75) Inventor: Dallas De Atley, San Francisco, CA (US)

(73) Assignee: Apple Inc., Cupertino, CA (US)

(*) Notice: Subject to any disclaimer, the term of this patent is extended or adjusted under 35 U.S.C. 154(b) by 936 days.

(21) Appl. No.: 11/938,745

(22) Filed: Nov. 12, 2007

(65) Prior Publication Data

US 2009/0098857 A1  Apr. 16, 2009

Related U.S. Application Data

(60) Provisional application No. 60/979,034, filed on Oct. 10, 2007.

(51) Int. Cl.
| H04W 24/00 | (2009.01) |
| H04M 1/66 | (2006.01) |
| G08B 1/08 | (2006.01) |
| G06F 17/30 | (2006.01) |
| H04M 1/725 | (2006.01) |

(52) U.S. Cl.
CPC ............ H04M 1/72552 (2013.01); H04M 1/66 (2013.01); *H04M 2250/10* (2013.01); *H04M 2250/22* (2013.01); *H04M 2250/60* (2013.01)
USPC ... 455/456.2; 455/411; 455/457; 340/539.13; 726/26

(58) Field of Classification Search
CPC ..... H04W 4/02; H04M 1/66; H04M 3/42348; H04M 2242/30; H04M 2250/60; H04M 2250/10; G06F 21/88
USPC ........ 455/404.2, 412.2, 410–411, 456.1–457; 726/26–29; 340/539.13
See application file for complete search history.

(56) References Cited

U.S. PATENT DOCUMENTS

| 4,644,351 A | 2/1987 | Zabarsky et al. |
| 4,903,212 A | 2/1990 | Yokouchi et al. |
| 4,907,159 A | 3/1990 | Mauge et al. |
| 5,031,104 A | 7/1991 | Ikeda et al. |
| 5,067,081 A | 11/1991 | Person |

(Continued)

FOREIGN PATENT DOCUMENTS

| BR | 9904979 | 12/2000 |
| CA | 2163215 | 5/1994 |

(Continued)

OTHER PUBLICATIONS

"27 Countries in your pocket"; [online] [Retrieved on Sep. 29, 2005] Retrieved from the Internet <URL: http://www.mio-tech.be/en/printview/press-releases-2005-09-29.htm; 1 page.

(Continued)

*Primary Examiner* — Michael Mapa
(74) *Attorney, Agent, or Firm* — Fish & Richardson P.C.

(57) ABSTRACT

Methods, systems, and computer-readable medium for securely locating a mobile device. In one implementation, a method is provided. The method includes receiving first information from a first device, where the first information is usable to identify a geographic location of the first device. The first information is verified as originating from the first device. A first request for the geographic location of the first device is received, where the first request includes second information associated with a user associated with the first device. The geographic location of the first device is provided to the user at a second device.

26 Claims, 8 Drawing Sheets

(56) References Cited

U.S. PATENT DOCUMENTS

| | | |
|---|---|---|
| 5,126,941 A | 6/1992 | Gurmu et al. |
| 5,164,904 A | 11/1992 | Sumner |
| 5,170,165 A | 12/1992 | Iihoshi et al. |
| 5,173,691 A | 12/1992 | Sumner |
| 5,182,555 A | 1/1993 | Sumner |
| 5,187,810 A | 2/1993 | Toneyama et al. |
| 5,195,031 A | 3/1993 | Ordish |
| 5,243,652 A | 9/1993 | Teare |
| 5,274,560 A | 12/1993 | LaRue |
| 5,295,064 A | 3/1994 | Malec et al. |
| 5,307,278 A | 4/1994 | Hermans et al. |
| 5,317,311 A | 5/1994 | Martell et al. |
| 5,337,044 A | 8/1994 | Folger et al. |
| 5,339,391 A | 8/1994 | Wroblewski et al. |
| 5,371,678 A | 12/1994 | Nomura |
| 5,379,057 A | 1/1995 | Clough et al. |
| 5,406,490 A | 4/1995 | Braegas |
| 5,416,890 A | 5/1995 | Beretta |
| 5,469,362 A | 11/1995 | Hunt et al. |
| 5,479,600 A | 12/1995 | Wroblewski et al. |
| 5,519,760 A | 5/1996 | Borkowski et al. |
| 5,523,950 A | 6/1996 | Peterson |
| 5,537,460 A | 7/1996 | Holliday, Jr. et al. |
| 5,539,395 A | 7/1996 | Buss |
| 5,539,647 A | 7/1996 | Shibata et al. |
| 5,552,989 A | 9/1996 | Bertrand |
| 5,559,520 A | 9/1996 | Barzeger et al. |
| 5,570,412 A | 10/1996 | LeBlanc |
| 5,598,572 A | 1/1997 | Tanikoshi et al. |
| 5,628,050 A | 5/1997 | McGraw |
| 5,636,245 A | 6/1997 | Ernst |
| 5,642,303 A | 6/1997 | Small |
| 5,646,853 A | 7/1997 | Takahashi et al. |
| 5,675,362 A | 10/1997 | Clough et al. |
| 5,684,859 A | 11/1997 | Chanroo et al. |
| 5,689,252 A | 11/1997 | Ayanoglu et al. |
| 5,689,431 A | 11/1997 | Rudow et al. |
| 5,708,478 A | 1/1998 | Tognazzini |
| 5,717,392 A | 2/1998 | Eldridge |
| 5,732,074 A | 3/1998 | Spaur et al. |
| 5,742,666 A | 4/1998 | Alpert |
| 5,745,865 A | 4/1998 | Rostoker et al. |
| 5,748,109 A | 5/1998 | Kosaka et al. |
| 5,752,186 A | 5/1998 | Malackowski et al. |
| 5,758,049 A | 5/1998 | Johnson et al. |
| 5,760,773 A | 6/1998 | Berman et al. |
| 5,767,795 A | 6/1998 | Schaphorst |
| 5,793,630 A | 8/1998 | Theimer |
| 5,825,884 A * | 10/1998 | Zdepski et al. ............ 705/78 |
| 5,831,552 A | 11/1998 | Sogawa et al. |
| 5,835,061 A | 11/1998 | Stewart |
| 5,839,086 A | 11/1998 | Hirano |
| 5,845,227 A | 12/1998 | Peterson |
| 5,862,244 A | 1/1999 | Kleiner et al. |
| 5,867,110 A | 2/1999 | Naito et al. |
| 5,870,686 A | 2/1999 | Monson |
| 5,872,526 A | 2/1999 | Tognazzini |
| 5,883,580 A | 3/1999 | Briancon |
| 5,893,898 A | 4/1999 | Tanimoto |
| 5,898,680 A | 4/1999 | Johnstone |
| 5,905,451 A | 5/1999 | Sakashita |
| 5,908,465 A | 6/1999 | Ito et al. |
| 5,910,799 A | 6/1999 | Carpenter |
| 5,923,861 A | 7/1999 | Bertram et al. |
| 5,933,094 A | 8/1999 | Goss et al. |
| 5,933,100 A | 8/1999 | Golding |
| 5,938,721 A | 8/1999 | Dussell et al. |
| 5,946,618 A | 8/1999 | Agre et al. |
| 5,948,040 A | 9/1999 | DeLorme et al. |
| 5,948,041 A | 9/1999 | Abo et al. |
| 5,948,061 A | 9/1999 | Merriman et al. |
| 5,959,577 A | 9/1999 | Fan |
| 5,959,580 A | 9/1999 | Maloney et al. |
| 5,968,109 A | 10/1999 | Israni et al. |
| 5,969,678 A | 10/1999 | Stewart |
| 5,982,298 A | 11/1999 | Lappenbusch et al. |
| 5,987,381 A | 11/1999 | Oshizawa |
| 6,005,928 A | 12/1999 | Johnson |
| 6,014,090 A | 1/2000 | Rosen et al. |
| 6,026,375 A | 2/2000 | Hall et al. |
| 6,028,550 A | 2/2000 | Froeberg et al. |
| 6,052,645 A | 4/2000 | Harada |
| 6,058,350 A | 5/2000 | Ihara |
| 6,064,335 A | 5/2000 | Eschenbach |
| 6,067,502 A | 5/2000 | Hayashida et al. |
| 6,069,570 A | 5/2000 | Herring |
| 6,073,013 A | 6/2000 | Agre et al. |
| 6,073,062 A | 6/2000 | Hoshino et al. |
| 6,085,148 A | 7/2000 | Jamison |
| 6,091,956 A | 7/2000 | Hollenberg |
| 6,091,957 A | 7/2000 | Larkins |
| 6,092,076 A | 7/2000 | McDonough et al. |
| 6,101,443 A | 8/2000 | Kato |
| 6,108,555 A | 8/2000 | Maloney et al. |
| 6,111,541 A | 8/2000 | Karmel |
| 6,115,754 A | 9/2000 | Landgren |
| 6,119,014 A | 9/2000 | Alperovich et al. |
| 6,122,520 A | 9/2000 | Want et al. |
| 6,134,548 A | 10/2000 | Gottsman et al. |
| 6,138,142 A | 10/2000 | Linsk |
| 6,151,309 A | 11/2000 | Busuioc et al. |
| 6,157,381 A | 12/2000 | Bates et al. |
| 6,163,749 A | 12/2000 | McDonough et al. |
| 6,166,627 A | 12/2000 | Reeley |
| 6,169,552 B1 | 1/2001 | Endo et al. |
| 6,177,938 B1 | 1/2001 | Gould |
| 6,185,427 B1 | 2/2001 | Krasner et al. |
| 6,195,609 B1 | 2/2001 | Pilley et al. |
| 6,199,014 B1 | 3/2001 | Walker |
| 6,199,045 B1 | 3/2001 | Giniger |
| 6,199,099 B1 | 3/2001 | Gershman et al. |
| 6,202,008 B1 | 3/2001 | Beckert et al. |
| 6,202,023 B1 | 3/2001 | Hancock et al. |
| 6,216,086 B1 | 4/2001 | Seymour et al. |
| 6,233,518 B1 | 5/2001 | Lee |
| 6,236,365 B1 | 5/2001 | LeBlanc et al. |
| 6,236,933 B1 | 5/2001 | Lang |
| 6,246,948 B1 | 6/2001 | Thakker |
| 6,252,544 B1 | 6/2001 | Hoffberg |
| 6,256,498 B1 | 7/2001 | Ludwig |
| 6,259,405 B1 | 7/2001 | Stewart et al. |
| 6,266,614 B1 | 7/2001 | Alumbaugh |
| 6,266,615 B1 | 7/2001 | Jin |
| 6,278,884 B1 | 8/2001 | Kim |
| 6,281,807 B1 | 8/2001 | Kynast et al. |
| 6,298,306 B1 | 10/2001 | Suarez et al. |
| 6,304,758 B1 | 10/2001 | Iierbig et al. |
| 6,313,761 B1 | 11/2001 | Shinada |
| 6,314,369 B1 | 11/2001 | Ito et al. |
| 6,314,406 B1 | 11/2001 | O'Hagan et al. |
| 6,321,158 B1 | 11/2001 | DeLorme et al. |
| 6,323,846 B1 | 11/2001 | Westerman et al. |
| 6,324,692 B1 | 11/2001 | Fiske |
| 6,326,918 B1 | 12/2001 | Stewart |
| 6,339,437 B1 | 1/2002 | Nielsen |
| 6,343,317 B1 | 1/2002 | Glorikian |
| 6,345,288 B1 | 2/2002 | Reed et al. |
| 6,353,398 B1 | 3/2002 | Amin et al. |
| 6,353,743 B1 | 3/2002 | Karmel |
| 6,353,837 B1 | 3/2002 | Blumenau |
| 6,356,761 B1 | 3/2002 | Huttunen |
| 6,356,836 B1 | 3/2002 | Adolph |
| 6,370,629 B1 | 4/2002 | Hastings et al. |
| 6,377,810 B1 * | 4/2002 | Geiger et al. ............ 455/456.2 |
| 6,377,886 B1 | 4/2002 | Gotou |
| 6,381,603 B1 | 4/2002 | Chan et al. |
| 6,385,535 B2 | 5/2002 | Ohishi et al. |
| 6,389,288 B1 | 5/2002 | Kuwahara et al. |
| 6,401,032 B1 | 6/2002 | Jamison |
| 6,405,123 B1 | 6/2002 | Rennar et al. |
| 6,414,635 B1 | 7/2002 | Stewart et al. |
| 6,415,227 B1 | 7/2002 | Lin |
| 6,434,530 B1 | 8/2002 | Sloane et al. |
| 6,438,490 B2 | 8/2002 | Ohta |

(56) References Cited

U.S. PATENT DOCUMENTS

| | | |
|---|---|---|
| 6,452,498 B2 | 9/2002 | Stewart |
| 6,456,234 B1 | 9/2002 | Johnson |
| 6,477,581 B1 | 11/2002 | Carpenter |
| 6,487,305 B2 | 11/2002 | Kambe et al. |
| 6,490,519 B1 | 12/2002 | Lapidot et al. |
| 6,501,421 B1 | 12/2002 | Dutta et al. |
| 6,505,046 B1 | 1/2003 | Baker |
| 6,505,123 B1 | 1/2003 | Root et al. |
| 6,535,140 B1 | 3/2003 | Goss et al. |
| 6,564,143 B1 | 5/2003 | Alewine et al. |
| 6,570,557 B1 | 5/2003 | Westerman et al. |
| 6,571,279 B1 | 5/2003 | Herz et al. |
| 6,574,484 B1 | 6/2003 | Carley |
| 6,587,688 B1 | 7/2003 | Chambers et al. |
| 6,587,835 B1 | 7/2003 | Treyz et al. |
| 6,611,687 B1 | 8/2003 | Clark et al. |
| 6,615,131 B1 | 9/2003 | Rennard et al. |
| 6,615,213 B1 | 9/2003 | Johnson |
| 6,647,257 B2 | 11/2003 | Owensby |
| 6,662,023 B1 | 12/2003 | Helle |
| 6,677,894 B2 | 1/2004 | Sheynblat et al. |
| 6,679,932 B2 | 1/2004 | Birler et al. |
| 6,681,120 B1 | 1/2004 | Kim |
| 6,683,538 B1 | 1/2004 | Wilkes, Jr. |
| 6,697,018 B2 | 2/2004 | Stewart |
| 6,711,474 B1 | 3/2004 | Treyz et al. |
| 6,718,344 B2 | 4/2004 | Hirono |
| 6,731,236 B1 | 5/2004 | Hager et al. |
| 6,731,238 B2 | 5/2004 | Johnson |
| 6,741,188 B1 | 5/2004 | Miller et al. |
| 6,741,926 B1 | 5/2004 | Zhao et al. |
| 6,748,226 B1 | 6/2004 | Wortham |
| 6,748,318 B1 | 6/2004 | Jones |
| 6,759,960 B2 | 7/2004 | Stewart |
| 6,762,772 B1 | 7/2004 | Imamura et al. |
| 6,771,954 B1 | 8/2004 | Yoneyama et al. |
| 6,782,278 B2 | 8/2004 | Chen et al. |
| 6,795,686 B2 | 9/2004 | Master et al. |
| 6,810,323 B1 | 10/2004 | Bullock et al. |
| 6,816,782 B1 | 11/2004 | Walters et al. |
| 6,845,318 B1 | 1/2005 | Moore et al. |
| 6,847,891 B2 | 1/2005 | Pietras et al. |
| 6,847,969 B1 | 1/2005 | Mathai et al. |
| 6,853,911 B1 | 2/2005 | Sakarya |
| 6,853,917 B2 | 2/2005 | Miwa |
| 6,859,149 B1 | 2/2005 | Ohta |
| 6,868,074 B1 | 3/2005 | Hanson |
| 6,882,313 B1 | 4/2005 | Fan et al. |
| 6,888,536 B2 | 5/2005 | Westerman et al. |
| 6,912,398 B1 | 6/2005 | Domnitz |
| 6,915,208 B2 | 7/2005 | Garin et al. |
| 6,944,447 B2 | 9/2005 | Portman et al. |
| 6,948,656 B2 | 9/2005 | Williams |
| 6,952,181 B2 | 10/2005 | Karr et al. |
| 6,954,735 B1 | 10/2005 | Djupsjobacka et al. |
| 6,975,959 B2 | 12/2005 | Dietrich et al. |
| 6,980,909 B2 | 12/2005 | Root et al. |
| 7,009,556 B2 | 3/2006 | Stewart |
| 7,044,372 B2 | 5/2006 | Okuda et al. |
| 7,054,594 B2 | 5/2006 | Bloch et al. |
| 7,058,594 B2 | 6/2006 | Stewart |
| 7,082,365 B2 | 7/2006 | Sheha et al. |
| 7,096,030 B2 | 8/2006 | Huomo |
| 7,103,470 B2 | 9/2006 | Mintz |
| 7,117,015 B2 | 10/2006 | Scheinert et al. |
| 7,123,189 B2 | 10/2006 | Lalik et al. |
| 7,123,926 B2 | 10/2006 | Himmelstein |
| 7,151,921 B2 | 12/2006 | Otsuka |
| 7,165,725 B2 | 1/2007 | Casey |
| 7,187,997 B2 | 3/2007 | Johnson |
| 7,222,293 B1 * | 5/2007 | Zapiec et al. ................ 715/205 |
| 7,236,883 B2 | 6/2007 | Garin et al. |
| 7,256,711 B2 | 8/2007 | Sheha et al. |
| 7,257,392 B2 | 8/2007 | Tang et al. |
| 7,269,601 B2 | 9/2007 | Kinno et al. |
| 7,298,327 B2 | 11/2007 | Dupray et al. |
| 7,310,516 B1 | 12/2007 | Vacanti et al. |
| 7,313,467 B2 | 12/2007 | Breed et al. |
| 7,339,496 B2 | 3/2008 | Endo et al. |
| 7,343,564 B2 | 3/2008 | Othmer |
| 7,349,706 B2 | 3/2008 | Kim et al. |
| 7,359,713 B1 | 4/2008 | Tiwari |
| 7,370,283 B2 | 5/2008 | Othmer |
| 7,386,396 B2 | 6/2008 | Johnson |
| 7,389,179 B2 | 6/2008 | Jin et al. |
| 7,427,021 B2 | 9/2008 | Kemper et al. |
| 7,500,607 B2 | 3/2009 | Williams |
| 7,525,484 B2 | 4/2009 | Dupray et al. |
| 7,565,157 B1 * | 7/2009 | Ortega et al. ............... 455/456.2 |
| 7,574,222 B2 | 8/2009 | Sawada et al. |
| 7,577,448 B2 | 8/2009 | Pande et al. |
| 7,620,404 B2 | 11/2009 | Chesnais et al. |
| 7,623,848 B2 | 11/2009 | Rosenfelt et al. |
| 7,710,290 B2 | 5/2010 | Johnson |
| 7,792,273 B2 | 9/2010 | Fano et al. |
| 7,890,089 B1 * | 2/2011 | Fujisaki ...................... 455/414.2 |
| 8,361,166 B2 | 1/2013 | Bhansali et al. |
| 8,395,968 B2 | 3/2013 | Vartanian et al. |
| 8,427,305 B2 | 4/2013 | Madsen et al. |
| 8,538,458 B2 | 9/2013 | Haney |
| 8,548,499 B2 | 10/2013 | Ortiz et al. |
| 8,600,405 B2 | 12/2013 | Madsen et al. |
| 8,647,768 B2 | 2/2014 | Sheem et al. |
| 2001/0018349 A1 | 8/2001 | Kinnunen et al. |
| 2002/0035493 A1 | 3/2002 | Mozayeny et al. |
| 2002/0035609 A1 | 3/2002 | Lessard et al. |
| 2002/0042266 A1 | 4/2002 | Heyward et al. |
| 2002/0046069 A1 | 4/2002 | Mozayeny et al. |
| 2002/0046077 A1 | 4/2002 | Mozayeny et al. |
| 2002/0046084 A1 | 4/2002 | Steele et al. |
| 2002/0087505 A1 | 7/2002 | Smith et al. |
| 2002/0091991 A1 | 7/2002 | Castro |
| 2002/0095486 A1 * | 7/2002 | Bahl ............................ 709/223 |
| 2002/0140560 A1 | 10/2002 | Altman et al. |
| 2002/0160815 A1 | 10/2002 | Patel et al. |
| 2002/0167442 A1 | 11/2002 | Taylor |
| 2003/0008662 A1 * | 1/2003 | Stern et al. .................... 455/456 |
| 2003/0014181 A1 | 1/2003 | Myr |
| 2003/0060212 A1 * | 3/2003 | Thomas ........................ 455/456 |
| 2003/0065934 A1 | 4/2003 | Angelo et al. |
| 2003/0069683 A1 | 4/2003 | Lapidot et al. |
| 2003/0074577 A1 | 4/2003 | Bean et al. |
| 2003/0100326 A1 | 5/2003 | Grube et al. |
| 2003/0100334 A1 | 5/2003 | Mazzara, Jr. |
| 2003/0101225 A1 | 5/2003 | Han et al. |
| 2003/0134657 A1 | 7/2003 | Norta et al. |
| 2003/0140136 A1 * | 7/2003 | Nakamura .................... 709/224 |
| 2003/0144793 A1 | 7/2003 | Melaku et al. |
| 2003/0191578 A1 | 10/2003 | Paulauskas et al. |
| 2003/0236106 A1 | 12/2003 | Master et al. |
| 2004/0010358 A1 | 1/2004 | Oesterling et al. |
| 2004/0036649 A1 | 2/2004 | Taylor |
| 2004/0054428 A1 | 3/2004 | Sheha et al. |
| 2004/0068439 A1 | 4/2004 | Elgrably |
| 2004/0110488 A1 * | 6/2004 | Komsi ........................... 455/411 |
| 2004/0128067 A1 | 7/2004 | Smith |
| 2004/0137941 A1 * | 7/2004 | Muthuswamy et al. ....... 455/419 |
| 2004/0151151 A1 | 8/2004 | Kubler et al. |
| 2004/0158401 A1 | 8/2004 | Yoon |
| 2004/0158584 A1 | 8/2004 | Necsoiu et al. |
| 2004/0172409 A1 | 9/2004 | James |
| 2004/0176907 A1 | 9/2004 | Nesbitt |
| 2004/0198335 A1 | 10/2004 | Campen |
| 2004/0198379 A1 | 10/2004 | Magee et al. |
| 2004/0203746 A1 * | 10/2004 | Knauerhase et al. ....... 455/432.1 |
| 2004/0203836 A1 | 10/2004 | Gorday et al. |
| 2004/0203909 A1 | 10/2004 | Koster |
| 2004/0215707 A1 * | 10/2004 | Fujita et al. ................... 709/201 |
| 2004/0228330 A1 | 11/2004 | Kubler et al. |
| 2004/0236504 A1 | 11/2004 | Bickford et al. |
| 2004/0242149 A1 | 12/2004 | Luneau |
| 2004/0246940 A1 | 12/2004 | Kubler et al. |
| 2004/0248586 A1 | 12/2004 | Patel et al. |
| 2004/0260939 A1 | 12/2004 | Ichikawa et al. |

(56) References Cited

U.S. PATENT DOCUMENTS

| | | | |
|---|---|---|---|
| 2004/0263084 A1* | 12/2004 | Mor et al. | 315/159 |
| 2004/0264442 A1 | 12/2004 | Kubler et al. | |
| 2005/0002419 A1 | 1/2005 | Doviak et al. | |
| 2005/0004838 A1 | 1/2005 | Perkowski et al. | |
| 2005/0009511 A1 | 1/2005 | Bostrom et al. | |
| 2005/0020315 A1* | 1/2005 | Robertson | 455/565 |
| 2005/0027442 A1 | 2/2005 | Kelley et al. | |
| 2005/0037781 A1* | 2/2005 | Ozugur et al. | 455/458 |
| 2005/0039140 A1 | 2/2005 | Chen | |
| 2005/0046584 A1 | 3/2005 | Breed | |
| 2005/0071702 A1 | 3/2005 | Morisawa | |
| 2005/0073443 A1* | 4/2005 | Sheha et al. | 340/995.1 |
| 2005/0085272 A1 | 4/2005 | Anderson et al. | |
| 2005/0096840 A1 | 5/2005 | Simske | |
| 2005/0114021 A1 | 5/2005 | Krull et al. | |
| 2005/0134578 A1 | 6/2005 | Chambers et al. | |
| 2005/0149250 A1 | 7/2005 | Isaac | |
| 2005/0153681 A1 | 7/2005 | Hanson | |
| 2005/0186954 A1* | 8/2005 | Kenney | 455/420 |
| 2005/0190789 A1* | 9/2005 | Salkini et al. | 370/466 |
| 2005/0197767 A1 | 9/2005 | Nortrup | |
| 2005/0203698 A1 | 9/2005 | Lee | |
| 2005/0221799 A1 | 10/2005 | Tervo et al. | |
| 2005/0221808 A1 | 10/2005 | Karlsson et al. | |
| 2005/0221843 A1 | 10/2005 | Friedman et al. | |
| 2005/0222756 A1 | 10/2005 | Davis et al. | |
| 2005/0227709 A1 | 10/2005 | Chang et al. | |
| 2005/0228860 A1 | 10/2005 | Hamynen et al. | |
| 2005/0239477 A1 | 10/2005 | Kim et al. | |
| 2005/0250440 A1 | 11/2005 | Zhou et al. | |
| 2005/0286421 A1 | 12/2005 | Janacek | |
| 2006/0015249 A1 | 1/2006 | Gieseke | |
| 2006/0022048 A1 | 2/2006 | Johnson | |
| 2006/0025158 A1 | 2/2006 | Leblanc et al. | |
| 2006/0041374 A1 | 2/2006 | Inoue | |
| 2006/0041377 A1 | 2/2006 | Jung et al. | |
| 2006/0041378 A1 | 2/2006 | Cheng et al. | |
| 2006/0056388 A1 | 3/2006 | Livingwood | |
| 2006/0058955 A1 | 3/2006 | Mehren | |
| 2006/0085392 A1 | 4/2006 | Wang et al. | |
| 2006/0094353 A1 | 5/2006 | Neilson et al. | |
| 2006/0111122 A1 | 5/2006 | Carlsan et al. | |
| 2006/0116137 A1 | 6/2006 | Jung | |
| 2006/0166679 A1 | 7/2006 | Karaoguz et al. | |
| 2006/0172778 A1 | 8/2006 | Sundararajan et al. | |
| 2006/0180649 A1 | 8/2006 | Casey | |
| 2006/0184978 A1 | 8/2006 | Casey | |
| 2006/0195481 A1 | 8/2006 | Arrouye et al. | |
| 2006/0199567 A1* | 9/2006 | Alston | 455/412.1 |
| 2006/0202819 A1 | 9/2006 | Adamczyk et al. | |
| 2006/0211453 A1 | 9/2006 | Schick | |
| 2006/0218209 A1 | 9/2006 | Arrouye et al. | |
| 2006/0229802 A1 | 10/2006 | Vertelney et al. | |
| 2006/0237385 A1 | 10/2006 | Williamson et al. | |
| 2006/0270421 A1 | 11/2006 | Phillips et al. | |
| 2006/0284767 A1 | 12/2006 | Taylor | |
| 2006/0287824 A1 | 12/2006 | Lin | |
| 2006/0291639 A1 | 12/2006 | Radziewicz et al. | |
| 2006/0293083 A1 | 12/2006 | Bowen | |
| 2007/0001875 A1 | 1/2007 | Taylor | |
| 2007/0003040 A1 | 1/2007 | Radziewicz et al. | |
| 2007/0005188 A1 | 1/2007 | Johnson | |
| 2007/0005233 A1 | 1/2007 | Pinkus et al. | |
| 2007/0006098 A1 | 1/2007 | Krumm et al. | |
| 2007/0010942 A1 | 1/2007 | Bill | |
| 2007/0016362 A1 | 1/2007 | Nelson | |
| 2007/0042790 A1 | 2/2007 | Mohi et al. | |
| 2007/0055684 A1 | 3/2007 | Steven | |
| 2007/0061245 A1 | 3/2007 | Ramer et al. | |
| 2007/0061301 A1 | 3/2007 | Ramer et al. | |
| 2007/0061363 A1 | 3/2007 | Ramer et al. | |
| 2007/0073480 A1 | 3/2007 | Singh | |
| 2007/0073719 A1 | 3/2007 | Ramer et al. | |
| 2007/0093258 A1 | 4/2007 | Steenstra et al. | |
| 2007/0106465 A1 | 5/2007 | Adam et al. | |
| 2007/0115868 A1 | 5/2007 | Chen et al. | |
| 2007/0124043 A1 | 5/2007 | Ayoub et al. | |
| 2007/0124066 A1 | 5/2007 | Kikuchi | |
| 2007/0127661 A1 | 6/2007 | Didcock | |
| 2007/0129888 A1 | 6/2007 | Rosenberg | |
| 2007/0130153 A1 | 6/2007 | Nachman et al. | |
| 2007/0135136 A1 | 6/2007 | Ische | |
| 2007/0135990 A1 | 6/2007 | Seymour et al. | |
| 2007/0149212 A1 | 6/2007 | Gupta et al. | |
| 2007/0150320 A1 | 6/2007 | Huang | |
| 2007/0153983 A1 | 7/2007 | Bloebaum et al. | |
| 2007/0153984 A1 | 7/2007 | Bloebaum et al. | |
| 2007/0153986 A1 | 7/2007 | Bloebaum et al. | |
| 2007/0156326 A1 | 7/2007 | Nesbitt | |
| 2007/0179854 A1 | 8/2007 | Ziv et al. | |
| 2007/0184855 A1 | 8/2007 | Klassen | |
| 2007/0200713 A1 | 8/2007 | Weber et al. | |
| 2007/0204162 A1* | 8/2007 | Rodriguez | 713/176 |
| 2007/0204218 A1 | 8/2007 | Weber et al. | |
| 2007/0206730 A1 | 9/2007 | Polk | |
| 2007/0219706 A1 | 9/2007 | Sheynblat | |
| 2007/0229549 A1 | 10/2007 | Dicke et al. | |
| 2007/0232272 A1* | 10/2007 | Gonsalves et al. | 455/412.1 |
| 2007/0232326 A1 | 10/2007 | Johnson | |
| 2007/0233387 A1 | 10/2007 | Johnson | |
| 2007/0254676 A1 | 11/2007 | Pedigo et al. | |
| 2007/0260751 A1 | 11/2007 | Meesseman | |
| 2007/0271328 A1 | 11/2007 | Geelen et al. | |
| 2007/0276586 A1 | 11/2007 | Jeon et al. | |
| 2007/0276587 A1 | 11/2007 | Johnson | |
| 2007/0276596 A1 | 11/2007 | Solomon et al. | |
| 2007/0282521 A1 | 12/2007 | Broughton | |
| 2007/0296573 A1* | 12/2007 | Schlesier et al. | 340/539.13 |
| 2007/0299601 A1 | 12/2007 | Zhao et al. | |
| 2008/0004802 A1 | 1/2008 | Horvitz | |
| 2008/0005104 A1 | 1/2008 | Flake et al. | |
| 2008/0005301 A1 | 1/2008 | Li et al. | |
| 2008/0015422 A1 | 1/2008 | Wessel | |
| 2008/0019335 A1* | 1/2008 | Wallace et al. | 370/338 |
| 2008/0021632 A1 | 1/2008 | Amano | |
| 2008/0024360 A1 | 1/2008 | Taylor | |
| 2008/0024364 A1 | 1/2008 | Taylor | |
| 2008/0027636 A1 | 1/2008 | Tengler et al. | |
| 2008/0030308 A1 | 2/2008 | Johnson | |
| 2008/0032703 A1 | 2/2008 | Krumm et al. | |
| 2008/0032721 A1 | 2/2008 | MacDonald et al. | |
| 2008/0045234 A1 | 2/2008 | Reed | |
| 2008/0052407 A1 | 2/2008 | Baudino et al. | |
| 2008/0055154 A1* | 3/2008 | Martucci et al. | 342/357.1 |
| 2008/0070593 A1 | 3/2008 | Altman et al. | |
| 2008/0071466 A1 | 3/2008 | Downs et al. | |
| 2008/0082254 A1 | 4/2008 | Huhtala et al. | |
| 2008/0085727 A1 | 4/2008 | Kratz | |
| 2008/0086240 A1 | 4/2008 | Breed | |
| 2008/0091347 A1 | 4/2008 | Tashiro | |
| 2008/0097698 A1 | 4/2008 | Arnold-Huyser et al. | |
| 2008/0098090 A1 | 4/2008 | Geraci et al. | |
| 2008/0104634 A1 | 5/2008 | Gajdos et al. | |
| 2008/0109153 A1 | 5/2008 | Gueziec | |
| 2008/0113672 A1 | 5/2008 | Karr et al. | |
| 2008/0129528 A1 | 6/2008 | Guthrie | |
| 2008/0132243 A1 | 6/2008 | Spalink et al. | |
| 2008/0132251 A1 | 6/2008 | Altman et al. | |
| 2008/0132252 A1 | 6/2008 | Altman et al. | |
| 2008/0140308 A1 | 6/2008 | Yamane et al. | |
| 2008/0140520 A1 | 6/2008 | Hyder et al. | |
| 2008/0153512 A1 | 6/2008 | Kale et al. | |
| 2008/0153513 A1 | 6/2008 | Flake et al. | |
| 2008/0155453 A1 | 6/2008 | Othmer | |
| 2008/0161034 A1 | 7/2008 | Akiyama | |
| 2008/0167083 A1 | 7/2008 | Wyld et al. | |
| 2008/0167811 A1 | 7/2008 | Geelen | |
| 2008/0172173 A1 | 7/2008 | Chang et al. | |
| 2008/0172374 A1 | 7/2008 | Wolosin et al. | |
| 2008/0176545 A1 | 7/2008 | Dicke et al. | |
| 2008/0177793 A1 | 7/2008 | Epstein et al. | |
| 2008/0178116 A1 | 7/2008 | Kim | |
| 2008/0186162 A1* | 8/2008 | Rajan et al. | 340/539.13 |
| 2008/0189033 A1 | 8/2008 | Geelen et al. | |

(56) References Cited

U.S. PATENT DOCUMENTS

| | | | |
|---|---|---|---|
| 2008/0207167 A1 | 8/2008 | Bugenhagen | |
| 2008/0233919 A1* | 9/2008 | Kenney | 455/411 |
| 2008/0249667 A1 | 10/2008 | Horvitz et al. | |
| 2008/0268876 A1 | 10/2008 | Gelfand et al. | |
| 2008/0271072 A1 | 10/2008 | Rothschild et al. | |
| 2008/0293397 A1* | 11/2008 | Gajdos et al. | 455/420 |
| 2008/0310850 A1 | 12/2008 | Pederson et al. | |
| 2008/0318550 A1 | 12/2008 | DeAtley | |
| 2009/0003659 A1 | 1/2009 | Forstall et al. | |
| 2009/0005005 A1 | 1/2009 | Forstall et al. | |
| 2009/0005018 A1 | 1/2009 | Forstall et al. | |
| 2009/0005021 A1 | 1/2009 | Forstall et al. | |
| 2009/0005068 A1 | 1/2009 | Forstall et al. | |
| 2009/0005070 A1 | 1/2009 | Forstall et al. | |
| 2009/0005071 A1 | 1/2009 | Forstall et al. | |
| 2009/0005072 A1 | 1/2009 | Forstall et al. | |
| 2009/0005076 A1 | 1/2009 | Forstall et al. | |
| 2009/0005080 A1 | 1/2009 | Forstall et al. | |
| 2009/0005082 A1 | 1/2009 | Forstall et al. | |
| 2009/0005964 A1 | 1/2009 | Forstall et al. | |
| 2009/0005965 A1 | 1/2009 | Forstall et al. | |
| 2009/0005975 A1 | 1/2009 | Forstall et al. | |
| 2009/0005978 A1 | 1/2009 | Forstall et al. | |
| 2009/0005981 A1 | 1/2009 | Forstall et al. | |
| 2009/0006336 A1 | 1/2009 | Forstall et al. | |
| 2009/0030605 A1 | 1/2009 | Breed | |
| 2009/0031006 A1 | 1/2009 | Johnson | |
| 2009/0033540 A1 | 2/2009 | Breed et al. | |
| 2009/0089706 A1 | 4/2009 | Furches et al. | |
| 2009/0177385 A1 | 7/2009 | Matas et al. | |
| 2009/0182492 A1 | 7/2009 | Alten | |
| 2009/0228961 A1 | 9/2009 | Wald et al. | |
| 2009/0234743 A1 | 9/2009 | Wald et al. | |
| 2009/0253408 A1 | 10/2009 | Fitzgerald et al. | |
| 2009/0259573 A1 | 10/2009 | Cheng et al. | |
| 2009/0271271 A1 | 10/2009 | Johnson | |
| 2009/0281724 A1 | 11/2009 | Blumenberg et al. | |
| 2009/0286549 A1 | 11/2009 | Sazegari et al. | |
| 2010/0131584 A1 | 5/2010 | Johnson | |
| 2010/0234060 A1 | 9/2010 | Beamish | |
| 2010/0265131 A1 | 10/2010 | Fabius | |
| 2010/0273452 A1 | 10/2010 | Rajan et al. | |
| 2011/0072520 A1 | 3/2011 | Bhansali et al. | |
| 2012/0025978 A1 | 2/2012 | Ferren et al. | |
| 2012/0210389 A1 | 8/2012 | Brown et al. | |
| 2012/0231811 A1 | 9/2012 | Zohar | |
| 2012/0324252 A1 | 12/2012 | Sarker | |
| 2013/0090110 A1 | 4/2013 | Cloonan et al. | |
| 2013/0326642 A1 | 12/2013 | Hajj et al. | |
| 2013/0326643 A1 | 12/2013 | Pai et al. | |

FOREIGN PATENT DOCUMENTS

| | | |
|---|---|---|
| CA | 2287596 | 4/2000 |
| CA | 2432239 | 12/2004 |
| DE | 3 621 456 | 1/1988 |
| DE | 4437360 | 4/1996 |
| DE | 19506890 | 8/1996 |
| DE | 19914257 | 3/1999 |
| DE | 10 141 695 | 3/2003 |
| EP | 0 288 068 | 7/1992 |
| EP | 785535 | 7/1997 |
| EP | 0 809 117 | 11/1997 |
| EP | 0 699 330 | 4/1998 |
| EP | 0 908 835 | 4/1999 |
| EP | 0 997 808 | 5/2000 |
| EP | 1 083 764 | 3/2001 |
| EP | 1 300 652 | 4/2003 |
| EP | 1 457 928 | 9/2004 |
| EP | 1 469 287 | 10/2004 |
| EP | 1 496 338 | 1/2005 |
| EP | 1 770 956 | 9/2005 |
| EP | 1 465 041 | 2/2006 |
| EP | 1 659 817 | 5/2006 |
| EP | 1 790 947 | 5/2007 |
| EP | 1 860 904 | 11/2007 |
| EP | 1 933 249 | 8/2008 |
| FR | 2730083 | 8/1996 |
| FR | 2754093 | 4/1998 |
| FR | 2272911 | 6/1999 |
| FR | 2810183 | 12/2001 |
| GB | 2 359 888 | 5/2001 |
| GB | 2 407 230 | 4/2005 |
| JP | 62142215 | 6/1987 |
| JP | 05-071974 | 3/1993 |
| JP | 06-525189 | 5/1994 |
| JP | 2007-221433 | 5/1994 |
| JP | 9-062993 | 7/1997 |
| JP | 9-210710 | 8/1997 |
| JP | 9-319300 | 12/1997 |
| JP | 11-234736 | 8/1999 |
| JP | 11331366 | 11/1999 |
| JP | 2000-163379 | 6/2000 |
| JP | 2001-160063 | 6/2001 |
| JP | 2001230858 A | 8/2001 |
| JP | 2002218048 A | 8/2002 |
| JP | 2002-310680 | 10/2002 |
| JP | 10-030933 | 2/2003 |
| JP | 2003-228532 | 8/2003 |
| JP | 2003224886 A | 8/2003 |
| JP | 2004-045054 | 2/2004 |
| JP | 2004-219146 | 7/2004 |
| JP | 2004-362271 | 12/2004 |
| JP | 2004356685 A | 12/2004 |
| JP | 2005-106741 | 4/2005 |
| JP | 2005142875 A | 6/2005 |
| JP | 2005-182146 | 7/2005 |
| JP | 2005-241519 | 9/2005 |
| JP | 2006-112338 | 4/2006 |
| JP | 2006-184007 | 7/2006 |
| JP | 2006-270889 | 10/2006 |
| JP | 2006-279838 | 10/2006 |
| JP | 2007-033220 | 2/2007 |
| JP | 2007-033331 | 2/2007 |
| JP | 2007-033368 | 2/2007 |
| JP | 2007-127439 | 5/2007 |
| JP | 2007/127439 | 5/2007 |
| JP | 2007-147439 | 6/2007 |
| JP | 2007-201699 | 8/2007 |
| JP | 2007-240400 | 9/2007 |
| JP | 2007-259291 | 10/2007 |
| JP | 2007-271299 | 10/2007 |
| JP | 2007-304009 | 11/2007 |
| JP | 2007306056 A | 11/2007 |
| JP | 2008-058917 | 3/2008 |
| JP | 2008-129774 | 6/2008 |
| JP | 2009124188 A | 6/2009 |
| KR | 2004-102440 | 12/2004 |
| KR | 2005-096746 | 10/2005 |
| TW | 200426387 | 12/2004 |
| WO | WO 93/20546 | 10/1993 |
| WO | WO 94/08250 | 4/1994 |
| WO | WO 97/07467 | 2/1997 |
| WO | WO 97/24577 | 7/1997 |
| WO | WO 98/03951 | 1/1998 |
| WO | WO 98/07112 | 2/1998 |
| WO | WO 98/54682 | 12/1998 |
| WO | WO 99/16036 | 4/1999 |
| WO | WO9916036 | 4/1999 |
| WO | WO 99/44183 | 9/1999 |
| WO | WO 01/37597 | 5/2001 |
| WO | WO 02/054813 | 7/2002 |
| WO | WO 03/023593 | 3/2003 |
| WO | WO 03/096055 | 11/2003 |
| WO | WO 2004/008792 | 1/2004 |
| WO | WO 2004/021730 | 3/2004 |
| WO | WO 2004/061576 | 7/2004 |
| WO | WO 2004/076977 | 9/2004 |
| WO | WO 2005/006258 | 1/2005 |
| WO | WO 2005/084052 | 9/2005 |
| WO | WO 2006/065856 | 6/2006 |
| WO | WO 2006/113125 | 10/2006 |
| WO | WO 2007/027065 | 3/2007 |

(56) References Cited

FOREIGN PATENT DOCUMENTS

| WO | WO 2007/052285 | 5/2007 |
|---|---|---|
| WO | WO 2008/051929 | 5/2008 |
| WO | WO 2008/085740 | 7/2008 |
| WO | WO 2009/140031 | 11/2009 |

OTHER PUBLICATIONS

"Animated Transition"; [online] [Retrieved on Oct. 16, 2006] Retrieved from the Internet <URL: http://designinterfaces.com/Animated_Transition; 2 pages.
"DaimlerCrysler Guide5 Usecases Overview Map", 1 page (no reference date).
"International Roaming Guide—Personal Experience(s) from Customer and Community Member"; [online] [Retrieved Jun. 26, 2006] Retrieved from the Internet <URL: http://forums.cingular.com/cng/board/message?board.id=1185; 6 pages.
"iPhone Software/Hardware Hack: LocoGPS—GPS Add-on for the iPhone"; [online] [Retrieved on Dec. 25, 2007] Retrieved from the Internet <URL: http://www.iphonehacks.com/iphone_applications/index.html; 41 pages.
"Mio 269+ Users Manula"; 2005; 44 pages.
"New program for mobile blogging for PocketPC released: My Blog"; [online] [Retrieved on Apr. 5, 2006]; Retrieved from the Internet, URL: http://msmobiles.com/news.php/4067.html.
"Numbering and Dialing Plan within the United States", Alliance for Telecommunications Industry Solutions; 2005; 17 pages.
Review Guide—Google Maps for mobile (beta); Google; 2006; 7 pages.
"User-centered design of mobile solutions", NAMAHN, 2006, 18 pages.
"User's Manual MioMap 2.0"; Aug. 2005; 60 pages.
"Windows Live Search for Mobile Goes Final, Still Great"; [online] [Retrieved on Mar. 11, 2007]; Retrieved from the Internet, URL: http://gizmodo.com/gadgets/software/windows-live-search-for-mobile-goes-final-still-great-236002.php; 3 pages.
"Windows Mobile 6 Professional Video Tour"; [online] [Retrieved on Mar. 11, 2007]; Retrieved from the Internet, URL: http://gizmodo.com/gadgets/cellphones/windows-mobile-6-professional-video-tour-237039.php; 4 pages.
"Windows Mobile"; Microsoft; 2007, 2 pages.
Anand et al., "Quantitative Analysis of Power Consumption for Location-Aware Applications on Smart Phones", IEEE International Symposium on Industrial Electronics, 2007.
Balliet, "Transportation Information Distribution System", IBM Technical Disclosure Bulletin, [online] [Retrieved Nov. 7, 2008] Retrieved from the Internet, URL: https://www.delphion.com/tdbs/tdb?order=86A+61395; Jun. 1986; 2 pages.
Beard et al., "Estimating Positions and Paths of Moving Objects", IEEE 2000, pp. 1-8.
Bederson, B.B., Audio Augmented Reality: A Prototype Automated Tour Guide [online] [retrieved on Aug. 30, 2002] [retrieved from http://www.cs.umd.edu/~bederson/papers/chi-95-aar/] pp. 1-4.
Berman et al., "The Role of Dead Reckoning and Inertial Sensors in Future General Aviation Navigation", IEEE, 1998, pp. 510-517.
Bevly et al., "Cascaded Kalman Filters for Accurate Estimation of Multiple Biases, Dead-Reckoning Navigation, and Full State Feedback Control of Ground Vehicles", IEEE Transactions on Control Systems in Technology, vol. 15, No. 2, Mar. 2007, pp. 199-208.
Binzhuo et al., "Mobile Phone GIS Based on Mobile SVG", IEEE 2005.
Bokharouss et al., "A Location-Aware Mobile Call Handling Assistant", International Conference on Advanced Information Networking and Applications Workshops, 2007.
Boonsrimuang et al., "Mobile Internet Navigation System", IEEE, 2002, pp. 325-328.
Camp et al., "A computer-based method for predicting transit time systems", Decsision Sciences, vol. 5, pp. 339-346, 1974.
Carew; "Phones that tell you where to drive, meet, eat"; [online] [Retrieved May 26, 2007]; Retrieved from the Internet <URL httlp://news.yahoo.com/s/nm/20070525/wr_nm/column_pluggedin_dc_2&printer=1;_ylt=Ahqaftn7xm1S2r0FZFeu9G4ht.cA; 2 pages.
Charny, "AT&T puts 411 to the text"; [online] [Retrieved Mar. 4, 2009]; Retrieved from the Internet <URL http://news.cnet.com/ATT-puts-411-to-the-text/2100-1039_3-1000669.html; May 8, 2003; 2 pages.
Cho et al., A Traveler Information Service Structure in Hybrid T-DMB and Cellular Communication Network, Broadcast Systems Research Group, IEEE, 2006, pp. 747-750.
Christie et al., "Development and Deployment of GPS wireless devices for E911 and Location based services", IEEE 2002.
Chua et al., "Intelligent Portal for Event-triggered SMS Alerts", 2nd International Conference on Mobile Technology, Applications and Systems, 2005.
Civilis et al., "Efficient Tracking of Moving Objects with Precision Guarantees", IEEE, Proceedings of the First Annual International Conference on Mobile and Ubiquitous Systems: Networking and Services, 2004, 10 pages.
Dibdin, Peter, "Where are mobile location based services?", Dec. 14, 2001, pp. 1-8.
Dunn et al., "Wireless Emergency Call System", IBM TDB, Sep. 1994.
Ebine, "Dual Frequency resonant base station antennas for PDC systems in Japan", IEEE, pp. 564-567, 1999.
Evans, "In-Vehicle Man-Machine Interaction the Socrates Approach", Vehicle Navigation & Information System Conference Proceedings, Aug. 31, 1994-Sep. 2, 1994, pp. 473-477.
FM 3-25.26 Map Reading and Land Navigation Field Manual No. 3-25.26, Headquarters Department of the Army, Washington, DC [online] [retrieved on Apr. 9, 2004] [retrieved from http://155.217.58.58/cgi-bin/atdl.dll/fm/3-25.26/toc.htm] Jul. 20, 2001, pp. 1-7 and J-1 to J-3.
*GPS 12 Personal Navigator Owner's Manual & Reference*, Garmin Corporation, Jan. 1999, pp. 1-60.
Guo et al., "An Intelligent Query System based on Chinese Short Message Service for Restaurant Recommendation", IEEE 2007, 1 page.
Hameed et al., "An Intelligent Agent-Based Medication and Emergency System", IEEE 2006.
Helal et al., "Drishti: An Integrated Navigation System for Visually Impaired and Disabled", Fifth International Symposium on Wearable Computers (ISWC'01), IEEE, 2001, pp. 149-156.
Hohman et al., "GPS Roadside Integrated Precision Positioning System", Position Location and Navigation Symposium (IEEE 2000), pp. 221-230.
International Numbering and SMS—Type of Numbering, TON, Numbering Plan Indicator, NPI, [online] [Retrieved Jan. 5, 2007] Retrieved from the Internet <URL: http://www.activeexperts.com/support/activsms/tonnpi/.
Jain, R., Potential Networking Applications of Global Positioning Systems (GPS) [online] [retrieved on Nov. 18, 2008] [retrieved from http://arxiv.org/ftp/cs/papers/9809/9809079.pdf] OSU Technical Report TR-24, Apr. 1996, pp. 1-40.
Jirawimut et al., "A Method for Dead Reckoning Parameter Correction in Pedestrian Navigation System", IEEE Transactions on Instrumentation and Measurement, vol. 52, No. 1, Feb. 2003, pp. 209-215.
Ju et al., "RFID Data Collection and Integration based on Mobile Agent", IEEE, 2006.
Kbar et al., "Mobile Station Location based on Hybrid of Signal Strength and Time of Arrival", IEEE, 2005.
Koide et al., "3-D Human Navigation System with Consideration of Neighboring Space Information", IEEE International Conference on Systems, Man and Cybernetics, 2006 (SMC '06), vol. 2, (Oct. 8-11, 2006), pp. 1693-1698.
Lloyd et al., "Cellular phone base stations installation violate the Electromagnetic Compatibility regulations", IEEE, 2004.
Manabe et al., "On the M-CubITS Pedestrian Navigation System", IEEE, 2006, pp. 793-798.
Meier et al., "Location-Aware Event-Base Middleware: A Paradigm for Collaborative Mobile Applications?", Sep. 2003.
Miller et al., "Synchronization of Mobile XML Databases by Utilizing Deferred Views", IEEE 2004.

(56) References Cited

OTHER PUBLICATIONS

Nardi et al., "Integrating Communication and Information through Contact Map", Communications of the ACM, vol. 45, No. 4, Apr. 2002.
Navizon Peer-to-Peer Wireless Positioning; [online] [Retrieved on Nov. 30, 2007]; Retrieved from the Internet, URL: http//www.navizon.com/; 2 pages.
Northard, "Docking Station Communication Link", IBM TDB, Feb. 1994.
Oh et al., "Spatial Applications Using 4S Technology for Mobile Environment", IEEE 2002.
Paksoy et al., "The Global Position System-Navigation Tool of the Future", Journal of Electrical & Electronics, 2002, vol. 2, No. 1, pp. 467-476.
Parikh, "Tele Locate", IBM Technical Disclosure Bulletin, [online] [Retrieved Nov. 7, 2008] Retrieved from the Internet, URL: https://www.delphion.com/tdbs/tdb?order=92A+62775; Sep. 1992; 1 page.
Partial International Search Report, dated Jul. 29, 2008, issued in corresponding PCT/US2008/050295.
International Search Report and Written Opinion, dated Jun. 9, 2008, issued in Interntiaonal Application No. PCT/US2007/088880, filed Dec. 27, 2007.
Pfoser et al., "Dynamic Travel Time Maps—Enabling Efficient Navigation", Proceedings of the 18th International Conference on Scientific and Statistical Database Management (SSDBM'06), IEEE, 10 pages.
Portfolio 2007; [online] [Retrieved on Jun. 14, 2007]; Retrieved from the Internet, URL: http://eric.wahlforss.com/folio; 3 pages.
RD 409052, Research Disclosure Alerting Abstract, "Location dependent information for satellite based vehicle communication-required application of Global Position System (GPS) to automatically extract relevant portions of data package as vehicle changes position," May 10, 1998, 1 page.
Rekimoto, J., *Augment-able Reality: Situated Communication through Physical and Digital Spaces*, iswc, pp. 68, Second International Symposium on Wearable computers (ISWC'98), 1998, pp. 1-8.
Rogers et al., "Adaptive User Interfaces for Automotive Environments", IEEE Intelligent Vehicles Symposium 2000, Oct. 3-5, 2000, pp. 662-667.
Rozier, J., *Hear & There: An Augmented Reality System of Linked Audio*, Proceedings of the International Conference on Auditory Display, Atlanta, GA, Apr. 2000, pp. 1-6.
Samadani et al., "PathMaker: Systems for Capturing Trips", IEEE (2004) International Conference on Multimedia and Expo., Publication Date: Jun. 27-30, 2004, vol. 3, pp. 2123-2126, 2004.
Schreiner, "Where We At? Mobile Phones Bring GPS to the Masses", IEEE Computers Society, May/Jun. 2007, pp. 6-11.
Spohrer. "New Paradigms for Using Computers", 1997; retrieved from the Internet, URL: <http://almaden.ibm.com/npuc97/1997/spohrer.htm>.
Sung et al., "Towards Reliable Peer-to-Peer Data Sharing over Mobile Ad hoc Networks", IEEE, 2005.
Weiss et al., "Zone services—An approach for location-based data collection", Proceedings of the 8th International Conference on E-commerce Technology and the 3rd IEEE International Conference on Enterprise Computing, E-Commerce and E-Services (8 pages), 2006.
Yang et al., "A Mutlimedia System for Route Sharing and Video-based Navigation", IEEE, 2006, pp. 73-76.
Yang et al. "Global Snapshots for Distributed Debugging", IEEE, pp. 436-440, 1992.
Yanyan et al., "The model of optimum route selection in vehicle automatic navigation system based on unblocked reliability analyses", IEEE 2003.
"Cyberguide: a mobile context-aware tour guide", Wireless Networks Archive (Special Issue: Mobile computing and networking; selecting papers from MobiCom '96), 3(5):421-433, 1997.
"Frontiers in electronic media", Interactions Archive 4(4):32-64, 1997.
"Location-aware mobile applications based on directory services", International Conference on Mobile Computing and Networking Archive, Proceedings on the 3rd Annual ACM/IEEE International Conference on Mobile Computing and Networking, Budapest, Hungary, pp. 23-33, 1997.
Sharpe et al., U.S. Appl. No. 12/434,586, filed May 1, 2009.
Sharpe et al., U.S. Appl. No. 12/434,582, filed May 1, 2009.
Van Os et al., U.S. Appl. No. 12/165,413, filed Jun. 30, 2008.
Blumenberg et al., U.S. Appl. No. 12/119,316, filed May 12, 2008.
Low et al., U.S. Appl. No. 12/233,358, filed Sep. 18, 2008.
Sazegari et al., U.S. Appl. No. 12/122,339, filed May 16, 2008.
Johnson, U.S. Appl. No. 12/044,363, filed Mar. 7, 2008.
Johnson, U.S. Appl. No. 11/827,065, filed Jul. 10, 2007.
Herz, U.S. Appl. No. 12/270,814, filed Nov. 13, 2008.
Budka et al., "A Bayesian method to Improve Mobile Geolocation Accuracy", IEEE, 2002, pp. 1021-1025.
Yamamoto et al., "Position Location Technologies Using Signal Strength in Cellular Systems", IEEE, 2001, pp. 2570-2575.
International Search Report and Written Opinion, dated Oct. 1, 2009, issued in PCT/US2009/041298.
Drane et al., "The accurate location of mobile telephones", Third Annual World Congress on Intelligent Transport Systems, Orlando, Florida, Oct. 1996.
"Travel Time Data Collection Handbook—Chapter 5: Its Probe Vehicle Techniques", FHWA-PL-98-035 Report, Department of Transport, University of Texas, Mar. 1998; [online] [Retrieved from the Internet at http://www.fhwa.dot.gov/ohim/handbook/chap5.pdf.
Ygnace et al., "Travel Time Estimation on the San Francisco Bay Area Network Using Cellular Phones as Probes", Working Paper, Institute of Transportation Studies, University of California, Berkeley, 2000.
Wang et al., "A Unified Vehicle Supervising and Traffic Information System", IEEE, 1996, pp. 968-972.
Weiss et al., "Zone services—An approach for location-based data collection", Proceedings of the 8th International Conference on E-commerce Technology and the 3rd IEEE International Conference on Enterprise Computing, E-Commerce and E-Services, 2006; 8 pages.
Dalrymple, "Google Maps adds locator, but not for iPhone," [online] [Retrieved Nov. 30, 2007]; Retrieved from the Internet URL: http://news.yahoo.com/s/macworld/20071130/tc_macworld/googlemaps20071130_0&printer=1;_ylt=Auvf3s6LQK_pOaJlb954T_DQn6gB; 1 page.
Feddema et al., "Cooperative Sentry Vehicles and Differential GPS Leapfrog," 2000, *United States Department of Energy*, pp. 1-12.
Maxwell et al., "Alfred: The Robot Waiter Who Remembers You," *AAAI Technical Report WS-99-15*, 1999, 12 pages.
Shibata et al., "Development and Integration of Generic Components for a Teachable Vision-Based Mobile Robot," *IEEE/ASME Transactions on Mechatronics*, 1996, 1(3):230-236.
Challe, "CARMINAT—An Integrated information and guidance system," Vehicle Navigation and Information Systems Conference, Oct. 20-23, 1991, Renault—Direction de la Recherche, Rueil-Malmaison, France.
Pungel, "Traffic control-beat the jam electronically," Funkschau, 1988, 18:43-45 (w/English translation).
Rillings and Betsold, "Advanced driver information systems," Vehicular Technology, IEEE Vehicular Technology Society, 1991, 40:31-40.
Tsuzawa and Okamoto, "Advanced Mobile Traffic Information and Communication System," First Vehicle Navigation and Information Systems Conference, Sep. 11-13, 1989, Toronto, Canada, Abstract only.
Wong, "GPS: making roads safer and solving traffic tangles," Asia Engineer, 1995, 23(9):31-32.

(56) References Cited

OTHER PUBLICATIONS

Yogesh C. Rathod, Third Party Submission in U.S. Appl. No. 12/233,358 mailed Mar. 30, 2010, 12 pages.

Ayatsuka et al., "UbiquitousLinks. Hypermedia Links Embedded in the Real World, Technical Report of Information Processing Society, 96-HI-67," Information Processing Society of Japan, Jul. 11, 1996, 96(62):23-30.

Nagao et al., Walk Navi: A Location-Aware Interactive Navigation/Guideline System and Software III, First edition, pp. 9-48, published by Kindai-Kagaku-Sya Co. Ltd., Dec. 10, 1995.

* cited by examiner

SECURELY LOCATING A DEVICE

CROSS-REFERENCE TO RELATED APPLICATIONS

This application claims priority to U.S. Provisional Patent Application Ser. No. 60/979,034 filed Oct. 10, 2007, and entitled "Securely Locating a Device," the contents of which are incorporated herein by reference.

TECHNICAL FIELD

The subject matter of this patent application is generally related to mobile devices.

BACKGROUND

Modern mobile devices can provide a number of functionalities, such as audio or video processing, telephony service, and network connectivity for e-mail and web browsing, for example. Mobile device users often depend on the multiple applications installed on these mobile devices to complete tasks in their professional lives and to provide entertainment in their personal lives. Users may rely on their mobile devices to store and access large amounts of content (e.g., image, audio, and video files) and sensitive information (e.g., financial data or personal information). The loss or theft of a mobile device can create security concerns for a user and can be particularly troublesome or upsetting, especially if data stored on the device is sensitive or irreplaceable.

SUMMARY

A technique, method, apparatus, and system are described to securely locate a mobile device. In general, in one aspect, a method is provided. The method includes receiving first information from a first device, where the first information is usable to identify a geographic location of the first device. The first information is verified as originating from the first device. A first request for the geographic location of the first device is received, where the first request includes second information associated with a user associated with the first device. The geographic location of the first device is provided to the user at a second device.

Implementations can include one or more of the following features. The second information associated with the user can be an identifier of the user. After verifying that the first information originated from the first device, the geographic location of the first device can be stored in a repository, and in response to receiving the first request, the second information can be used to index into the repository to retrieve the geographic location of the first device. In response to receiving the first request, a second request can be transmitted to the first device for an updated geographic location of the first device, and third information can be received from the first device, where the third information is usable to identify an updated geographic location of the first device. Third information can be received from the first device, where the third information identifies the first device and is used to verify that the first information originated from the first device. The first information and the third information identifying the first device can be received from the first device in a Domain Name System (DNS) message. Alternatively, the first information can be included in a text message that is digitally signed with a private key of the first device. Verifying that the first information originated from the first device can further include authenticating the digitally signed text message. A map of the geographic location of the first device can be provided to the user at the second device. The first device can be a mobile device that includes a telephony application. The first device can be a mobile device that includes a multi-touch-sensitive display. It can be determined if the geographic location of the first device is outside a region specified by the user, and if the geographic location of the first device is outside the region, data stored on the first device can be caused to be erased, where the data to be erased is specified by the user.

Other implementations are disclosed, including implementations directed to methods, systems, and computer-readable mediums.

Particular embodiments of the subject matter described in this specification can be implemented to realize one or more of the following advantages. A mobile device user can log into a mobile service application with a user identifier to view a last known geographic location of the user's missing mobile device. The mobile service application can present to the user on a host device the last known geographic location of the missing mobile device as an address, geographic coordinates, or as a location on a map. The user can request that the mobile device transmit an updated location to the mobile service application for presentation to the user on the host device.

DETAILED DESCRIPTION

Example Mobile Device

Figure 1A:
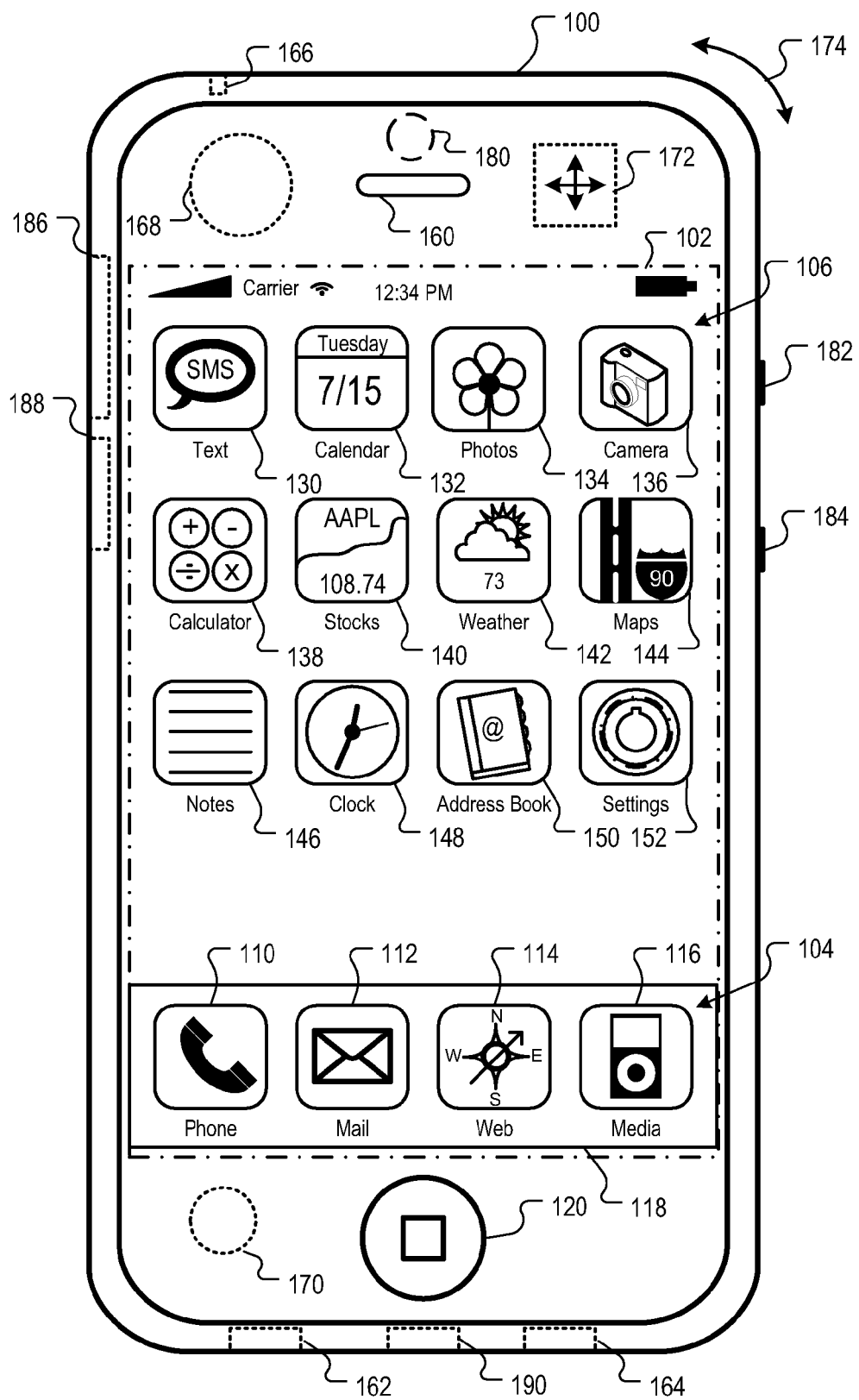
FIG. 1A is a block diagram of an example mobile device.

FIG. 1A is a block diagram of an example mobile device 100. The mobile device 100 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

Mobile Device Overview

In some implementations, the mobile device 100 includes a touch-sensitive display 102. The touch-sensitive display 102 can implement liquid crystal display (LCD) technology, light emitting polymer display (LPD) technology, or some other display technology. The touch-sensitive display 102 can be sensitive to haptic and/or tactile contact with a user.

In some implementations, the touch-sensitive display 102 can comprise a multi-touch-sensitive display 102. A multi-touch-sensitive display 102 can, for example, process multiple simultaneous touch points, including processing data related to the pressure, degree, and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846, 6,570,557, 6,677,932, and 6,888,536, each of which is incorporated by reference herein in its entirety.

In some implementations, the mobile device 100 can display one or more graphical user interfaces on the touch-sensitive display 102 for providing the user access to various system objects and for conveying information to the user. In some implementations, the graphical user interface can include one or more display objects 104, 106. In the example shown, the display objects 104, 106, are graphic representations of system objects. Some examples of system objects include device functions, applications, windows, files, alerts, events, or other identifiable system objects.

Example Mobile Device Functionality

In some implementations, the mobile device 100 can implement multiple device functionalities, such as a telephony device, as indicated by a phone object 110; an e-mail device, as indicated by the e-mail object 112; a network data communication device, as indicated by the Web object 114; a Wi-Fi base station device (not shown); and a media processing device, as indicated by the media player object 116. In some implementations, particular display objects 104, e.g., the phone object 110, the e-mail object 112, the Web object 114, and the media player object 116, can be displayed in a menu bar 118. In some implementations, device functionalities can be accessed from a top-level graphical user interface, such as the graphical user interface illustrated in FIG. 1A. Touching one of the objects 110, 112, 114, or 116 can, for example, invoke corresponding functionality.

In some implementations, the mobile device 100 can implement network distribution functionality. For example, the functionality can enable the user to take the mobile device 100 and provide access to its associated network while traveling. In particular, the mobile device 100 can extend Internet access (e.g., Wi-Fi) to other wireless devices in the vicinity. For example, mobile device 100 can be configured as a base station for one or more devices. As such, mobile device 100 can grant or deny network access to other wireless devices.

In some implementations, upon invocation of device functionality, the graphical user interface of the mobile device 100 changes, or is augmented or replaced with another user interface or user interface elements, to facilitate user access to particular functions associated with the corresponding device functionality. For example, in response to a user touching the phone object 110, the graphical user interface of the touch-sensitive display 102 may present display objects related to various phone functions; likewise, touching of the email object 112 may cause the graphical user interface to present display objects related to various e-mail functions; touching the Web object 114 may cause the graphical user interface to present display objects related to various Web-surfing functions; and touching the media player object 116 may cause the graphical user interface to present display objects related to various media processing functions.

In some implementations, the top-level graphical user interface environment or state of FIG. 1A can be restored by pressing a button 120 located near the bottom of the mobile device 100. In some implementations, each corresponding device functionality may have corresponding "home" display objects displayed on the touch-sensitive display 102, and the graphical user interface environment of FIG. 1A can be restored by pressing the "home" display object.

In some implementations, the top-level graphical user interface can include additional display objects 106, such as a short messaging service (SMS) object 130, a calendar object 132, a photos object 134, a camera object 136, a calculator object 138, a stocks object 140, a weather object 142, a maps object 144, a notes object 146, a clock object 148, an address book object 150, and a settings object 152. Touching the SMS display object 130 can, for example, invoke an SMS messaging environment and supporting functionality; likewise, each selection of a display object 132, 134, 136, 138, 140, 142, 144, 146, 148, 150, and 152 can invoke a corresponding object environment and functionality.

Additional and/or different display objects can also be displayed in the graphical user interface of FIG. 1A. For example, if the device 100 is functioning as a base station for other devices, one or more "connection" objects may appear in the graphical user interface to indicate the connection. In some implementations, the display objects 106 can be configured by a user, e.g., a user may specify which display objects 106 are displayed, and/or may download additional applications or other software that provides other functionalities and corresponding display objects.

In some implementations, the mobile device 100 can include one or more input/output (I/O) devices and/or sensor devices. For example, a speaker 160 and a microphone 162 can be included to facilitate voice-enabled functionalities, such as phone and voice mail functions. In some implementations, an up/down button 184 for volume control of the speaker 160 and the microphone 162 can be included. The mobile device 100 can also include an on/off button 182 for a ring indicator of incoming phone calls. In some implementations, a loud speaker 164 can be included to facilitate hands-free voice functionalities, such as speaker phone functions. An audio jack 166 can also be included for use of headphones and/or a microphone.

In some implementations, a proximity sensor 168 can be included to facilitate the detection of the user positioning the mobile device 100 proximate to the user's ear and, in response, to disengage the touch-sensitive display 102 to prevent accidental function invocations. In some implementations, the touch-sensitive display 102 can be turned off to conserve additional power when the mobile device 100 is proximate to the user's ear.

Other sensors can also be used. For example, in some implementations, an ambient light sensor 170 can be utilized to facilitate adjusting the brightness of the touch-sensitive display 102. In some implementations, an accelerometer 172 can be utilized to detect movement of the mobile device 100, as indicated by the directional arrow 174. Accordingly, display objects and/or media can be presented according to a detected orientation, e.g., portrait or landscape. In some implementations, the mobile device 100 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 100 or provided as a separate device that can be coupled to the mobile device 100 through an interface (e.g., port device 190) to provide access to location-based services or secure device location services.

In some implementations, a port device 190, e.g., a Universal Serial Bus (USB) port, or a docking port, or some other wired port connection, can be included. The port device 190 can, for example, be utilized to establish a wired connection to other computing devices, such as other communication devices 100, network access devices, a personal computer, a printer, a display screen, or other processing devices capable of receiving and/or transmitting data. In some implementations, the port device 190 allows the mobile device 100 to synchronize with a host device using one or more protocols, such as, for example, the TCP/IP, HTTP, UDP and any other known protocol. In some implementations, a TCP/IP over USB protocol can be used, as described in U.S. Provisional Patent Application No. 60/945,904, filed Jun. 22, 2007, for "Multiplexed Data Stream Protocol," which provisional patent application is incorporated by reference herein in its entirety.

The mobile device 100 can also include a camera lens and sensor 180. In some implementations, the camera lens and sensor 180 can be located on the back surface of the mobile device 100. The camera can capture still images and/or video.

The mobile device 100 can also include one or more wireless communication subsystems, such as an 802.11b/g communication device 186, and/or a Bluetooth™ communication device 188. Other communication protocols can also be supported, including other 802.x communication protocols (e.g., WiMax, Wi-Fi, 3G), code division multiple access (CDMA), global system for mobile communications (GSM), general packet radio service (GPRS), Enhanced Data GSM Environment (EDGE), etc.

Example Mobile Device

Figure 1B:
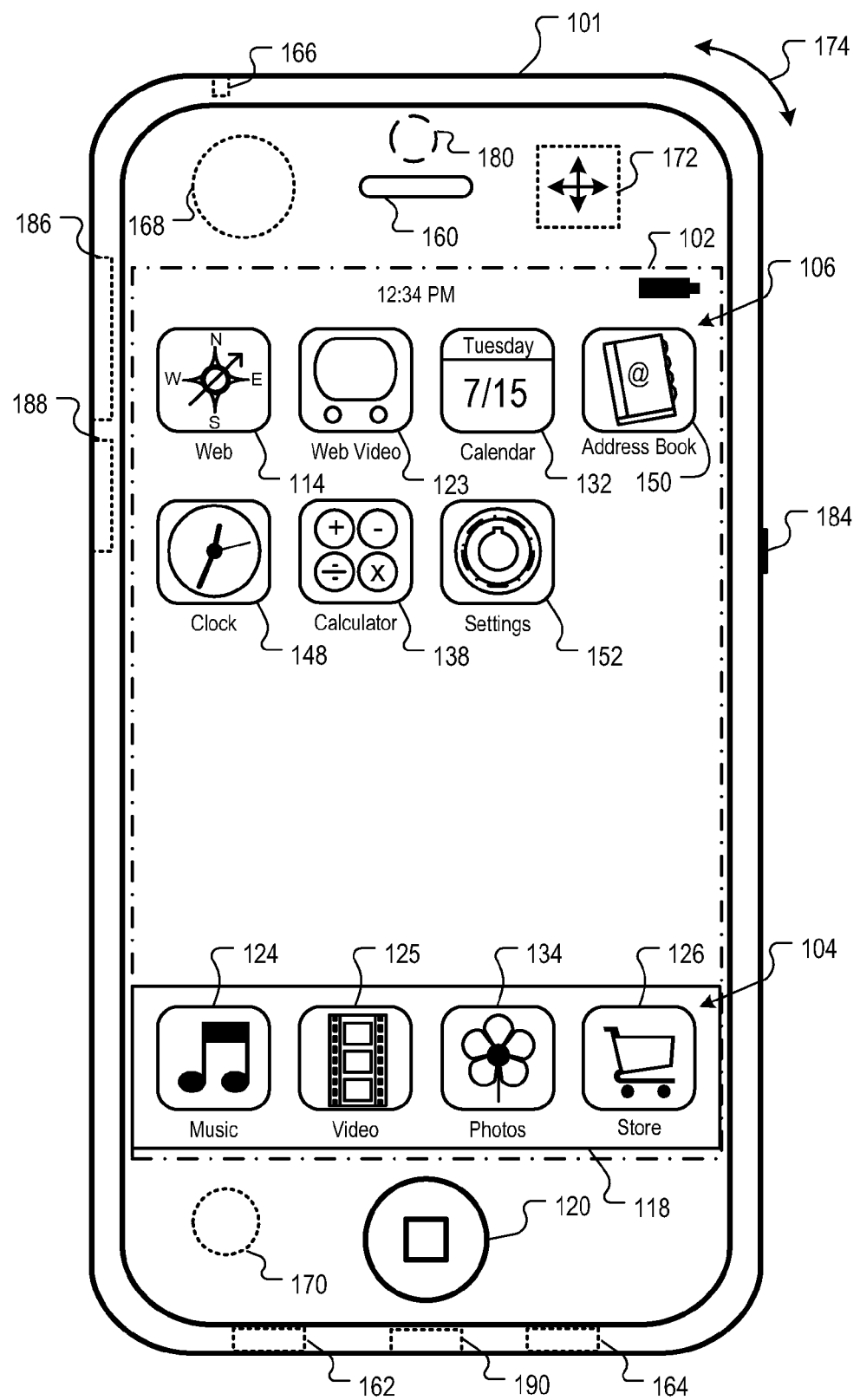
FIG. 1B is a block diagram of an example mobile device.

FIG. 1B is a block diagram of an example mobile device 101. The mobile device 101 can be, for example, a handheld computer, a personal digital assistant, a network appliance, a camera, a network base station, a media player, a navigation device, an email device, a game console, or a combination of any two or more of these data processing devices or other data processing devices. In some implementations, device 101 shown in FIG. 1B is an example of how device 100 can be configured to display a different set of objects. In some implementations, device 101 has a different set of device functionalities than device 100 shown in FIG. 1A, but otherwise operates in a similar manner to device 100.

Mobile Device Overview

In some implementations, the mobile device 101 includes a touch-sensitive display 102, which can be sensitive to haptic and/or tactile contact with a user. In some implementations, the mobile device 101 can display one or more graphical user interfaces on the touch-sensitive display 102 for providing the user access to various system objects and for conveying information to the user.

Mobile Device Functionality

In some implementations, the mobile device 101 can implement multiple device functionalities, such as a music processing device, as indicated by the music player object 124, a video processing device, as indicated by the video player object 125, a digital photo album device, as indicated by the photos object 134, and a network data communication device for online shopping, as indicated by the store object 126. In some implementations, particular display objects 104, e.g., the music player object 124, the video player object 125, the photos object 134, and store object 126, can be displayed in a menu bar 118. In some implementations, device functionalities can be accessed from a top-level graphical user interface, such as the graphical user interface illustrated in FIG. 1B. Touching one of the objects 124, 125, 134, or 126 can, for example, invoke corresponding functionality.

In some implementations, the top-level graphical user interface of mobile device 101 can include additional display objects 106, such as the Web object 114, the calendar object 132, the address book object 150, the clock object 148, the calculator object 138, and the settings object 152 described above with reference to mobile device 100 of FIG. 1A. In some implementations, the top-level graphical user interface can include other display objects, such as a Web video object 123 that provides functionality for uploading and playing videos on the Web. Each selection of a display object 114, 123, 132, 150, 148, 138, and 152 can invoke a corresponding object environment and functionality.

Additional and/or different display objects can also be displayed in the graphical user interface of FIG. 1B. In some implementations, the display objects 106 can be configured by a user. In some implementations, upon invocation of device functionality, the graphical user interface of the mobile device 101 changes, or is augmented or replaced with another user interface or user interface elements, to facilitate user access to particular functions associated with the corresponding device functionality.

In some implementations, the mobile device 101 can include one or more input/output (I/O) devices 160, 162, 164, and 166, a volume control device 184, sensor devices 168, 170, 172, and 180, wireless communication subsystems 186 and 188, and a port device 190 or some other wired port connection described above with reference to mobile device 100 of FIG. 1A.

Network Operating Environment

Figure 2:
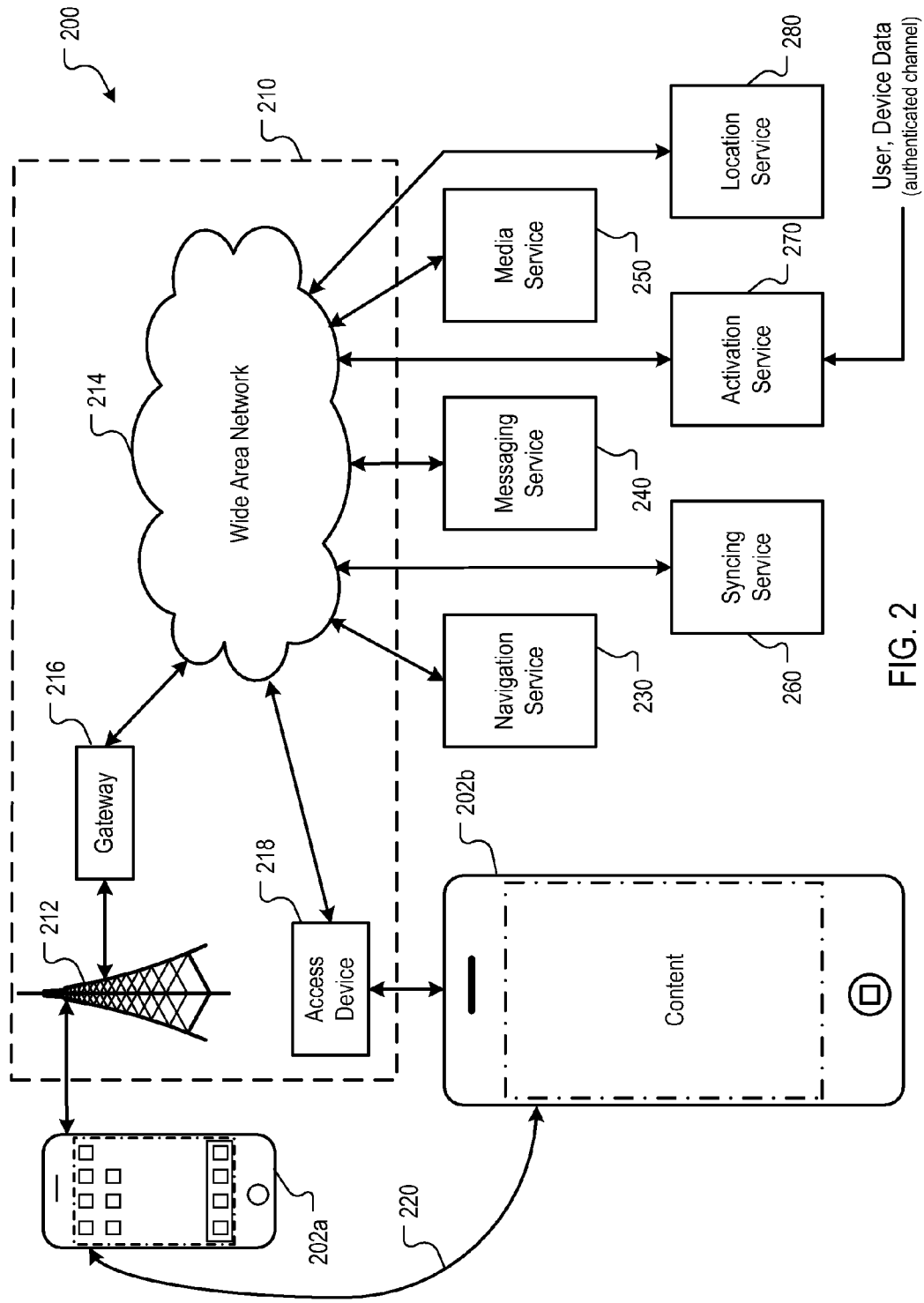
FIG. 2 is a block diagram of an example network operating environment for the mobile devices of FIGS. 1A-1B.

FIG. 2 is a block diagram of an example network operating environment 200. In FIG. 2, mobile devices 202*a* and 202*b* each can represent mobile device 100 or 101. Mobile devices 202*a* and 202*b* can, for example, communicate over one or more wired and/or wireless networks 210 in data communication. For example, a wireless network 212, e.g., a cellular network, can communicate with a wide area network (WAN) 214, such as the Internet, by use of a gateway 216. Likewise, an access device 218, such as an 802.11g wireless access device, can provide communication access to the wide area network 214. In some implementations, both voice and data communications can be established over the wireless network 212 and the access device 218. For example, the mobile device 202*a* can place and receive phone calls (e.g., using VoIP protocols), send and receive e-mail messages (e.g., using POP3 protocol), and retrieve electronic documents and/or streams, such as web pages, photographs, and videos, over the wireless network 212, gateway 216, and wide area network 214 (e.g., using TCP/IP or UDP protocols). Likewise, in some implementations, the mobile device 202*b* can place and receive phone calls, send and receive e-mail messages, and retrieve electronic documents over the access device 218 and the wide area network 214. In some implementations, the mobile device 202*a* or 202*b* can be physically connected to the access device 218 using one or more cables and the access device 218 can be a personal computer. In this configuration, the mobile device 202a or 202b can be referred to as a "tethered" device.

The mobile devices 202a and 202b can also establish communications by other means. For example, the wireless device 202a can communicate with other wireless devices, e.g., other mobile devices 202a or 202b, cell phones, etc., over the wireless network 212. Likewise, the mobile devices 202a and 202b can establish peer-to-peer communications 220, e.g., a personal area network, by use of one or more communication subsystems, such as the Bluetooth™ communication devices 188 shown in FIGS. 1A-1B. Other communication protocols and topologies can also be implemented.

The mobile device 202a or 202b can, for example, communicate with one or more services 230, 240, 250, 260, 270, and 280 over the one or more wired and/or wireless networks 210. For example, a navigation service 230 can provide navigation information, e.g., map information, location information, route information, and other information, to the mobile device 202a or 202b. A user of the mobile device 202b can invoke a map functionality, e.g., by pressing the maps object 144 on the top-level graphical user interface shown in FIG. 1A, and can request and receive a map for a particular location.

A messaging service 240 can, for example, provide e-mail and/or other messaging services. A media service 250 can, for example, provide access to media files, such as song files, audio books, movie files, video clips, and other media data. In some implementations, separate audio and video services (not shown) can provide access to the respective types of media files. A syncing service 260 can, for example, perform syncing services (e.g., sync files). An activation service 270 can, for example, perform an activation process for activating the mobile device 202a or 202b. A location service 280 can, for example, perform the process 500 for securely locating the mobile device 202a or 202b and providing the location to a user on a host device, as described in reference to FIG. 5. For example, the location service 280 can receive from the mobile device 202a or 202b location information pushed or pulled automatically, e.g., at scheduled intervals. Other services can also be provided, including a software update service that automatically determines whether software updates exist for software on the mobile device 202a or 202b, then downloads the software updates to the mobile device 202a or 202b where the software updates can be manually or automatically unpacked and/or installed.

The mobile device 202a or 202b can also access other data and content over the one or more wired and/or wireless networks 210. For example, content publishers, such as news sites, RSS feeds, web sites, blogs, social networking sites, developer networks, etc., can be accessed by the mobile device 202a or 202b. Such access can be provided by invocation of a web browsing function or application (e.g., a browser) in response to a user touching the Web object 114.

Example Mobile Device Architecture

Figure 3:
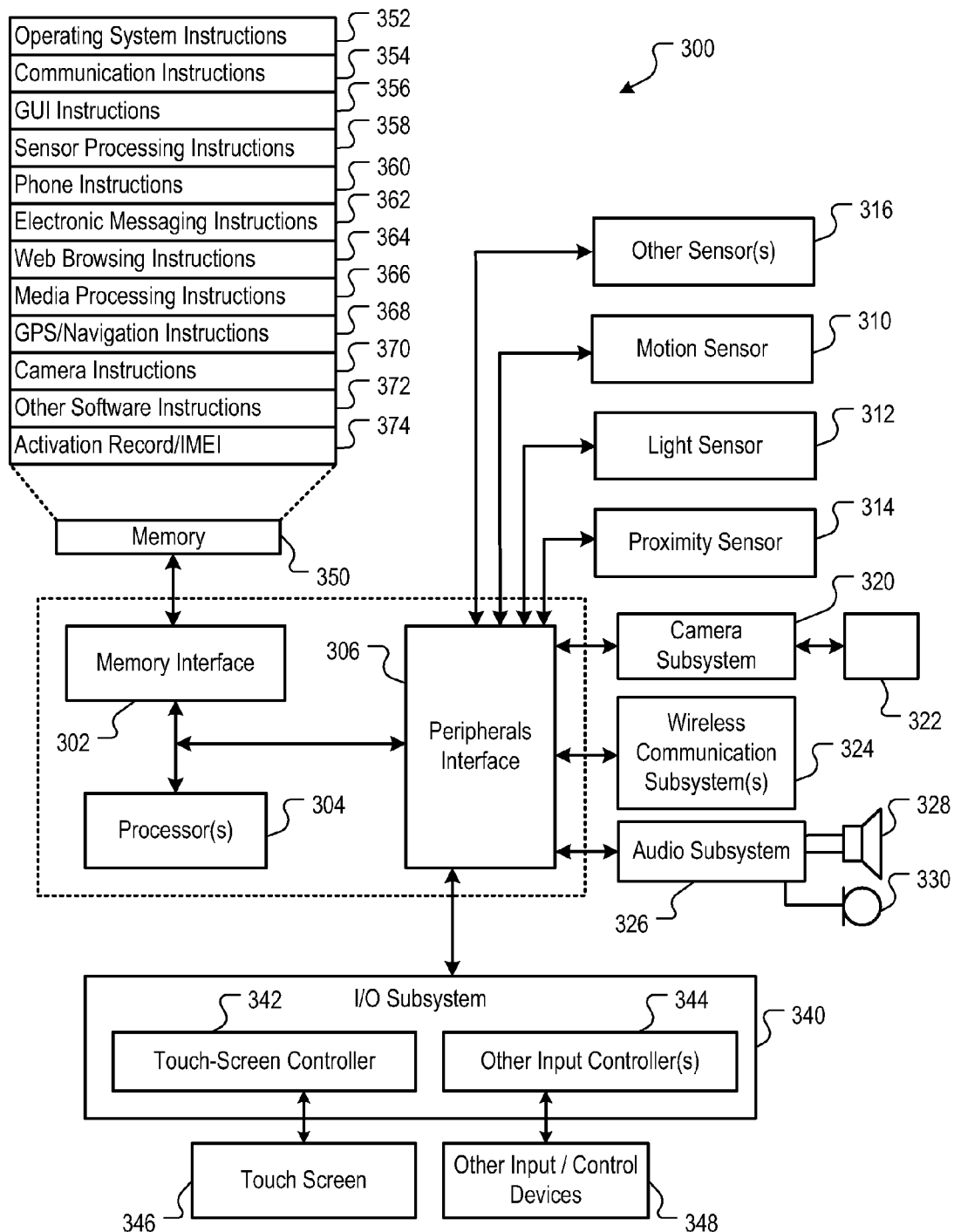
FIG. 3 is a block diagram of an example implementation of the mobile devices of FIGS. 1A-1B.

FIG. 3 is a block diagram 300 of an example implementation of the mobile devices 100 and 101 of FIGS. 1A-1B, respectively. The mobile device 100 or 101 can include a memory interface 302, one or more data processors, image processors and/or central processing units 304, and a peripherals interface 306. The memory interface 302, the one or more processors 304 and/or the peripherals interface 306 can be separate components or can be integrated in one or more integrated circuits. The various components in the mobile device 100 or 101 can be coupled by one or more communication buses or signal lines.

Sensors, devices, and subsystems can be coupled to the peripherals interface 306 to facilitate multiple functionalities. For example, a motion sensor 310, a light sensor 312, and a proximity sensor 314 can be coupled to the peripherals interface 306 to facilitate the orientation, lighting, and proximity functions described with respect to FIG. 1A. Other sensors 316 can also be connected to the peripherals interface 306, such as a positioning system (e.g., GPS receiver), a temperature sensor, a biometric sensor, or other sensing device, to facilitate related functionalities.

A camera subsystem 320 and an optical sensor 322, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 324, which can include radio frequency receivers and transmitters and/or optical (e.g., infrared) receivers and transmitters. The specific design and implementation of the communication subsystem 324 can depend on the communication network(s) over which the mobile device 100 or 101 is intended to operate. For example, a mobile device 100 or 101 may include communication subsystems 324 designed to operate over a GSM network, a GPRS network, an EDGE network, a Wi-Fi or WiMax network, and a Bluetooth™ network. In particular, the wireless communication subsystems 324 may include hosting protocols such that the device 100 or 101 may be configured as a base station for other wireless devices.

An audio subsystem 326 can be coupled to a speaker 328 and a microphone 330 to facilitate voice-enabled functions, such as voice recognition, voice replication, digital recording, and telephony functions.

The I/O subsystem 340 can include a touch screen controller 342 and/or other input controller(s) 344. The touch-screen controller 342 can be coupled to a touch screen 346. The touch screen 346 and touch screen controller 342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 346.

The other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of the speaker 328 and/or the microphone 330.

In one implementation, a pressing of the button for a first duration may disengage a lock of the touch screen 346; and a pressing of the button for a second duration that is longer than the first duration may turn power to the mobile device 100 or 101 on or off. The user may be able to customize a functionality of one or more of the buttons. The touch screen 346 can, for example, also be used to implement virtual or soft buttons and/or a keyboard.

In some implementations, the mobile device 100 or 101 can present recorded audio and/or video files, such as MP3, AAC, and MPEG files. In some implementations, the mobile device 100 or 101 can include the functionality of an MP3 player, such as an iPod™. The mobile device 100 or 101 may, therefore, include a 36-pin connector that is compatible with the iPod. Other input/output and control devices can also be used.

The memory interface 302 can be coupled to memory 350. The memory 350 can include high-speed random access memory and/or non-volatile memory, such as one or more magnetic disk storage devices, one or more optical storage devices, and/or flash memory (e.g., NAND, NOR). The memory 350 can store an operating system 352, such as Darwin, RTXC, LINUX, UNIX, OS X, WINDOWS, or an embedded operating system such as VxWorks. The operating system 352 may include instructions for handling basic system services and for performing hardware dependent tasks. In some implementations, the operating system 352 can be a kernel (e.g., UNIX kernel), as described in reference to FIGS. 4A and 4B.

The memory 350 may also store communication instructions 354 to facilitate communicating with one or more additional devices, one or more computers and/or one or more servers. The memory 350 may include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions; camera instructions 370 to facilitate camera-related processes and functions; and/or other software instructions 372 to facilitate other processes and functions, e.g., security processes and functions as described in reference to FIGS. 4A and 4B. The memory 350 may also store other software instructions (not shown), such as web video instructions to facilitate web video-related processes and functions; and/or web shopping instructions to facilitate web shopping-related processes and functions. In some implementations, the media processing instructions 366 are divided into audio processing instructions and video processing instructions to facilitate audio processing-related processes and functions and video processing-related processes and functions, respectively. An activation record and International Mobile Equipment Identity (IMEI) 374 or similar hardware identifier can also be stored in memory 350.

Each of the above identified instructions and applications can correspond to a set of instructions for performing one or more functions described above. These instructions need not be implemented as separate software programs, procedures, or modules. The memory 350 can include additional instructions or fewer instructions. Furthermore, various functions of the mobile device 100 or 101 may be implemented in hardware and/or in software, including in one or more signal processing and/or application specific integrated circuits.

Software Stack and Security Process

Figure 4A:
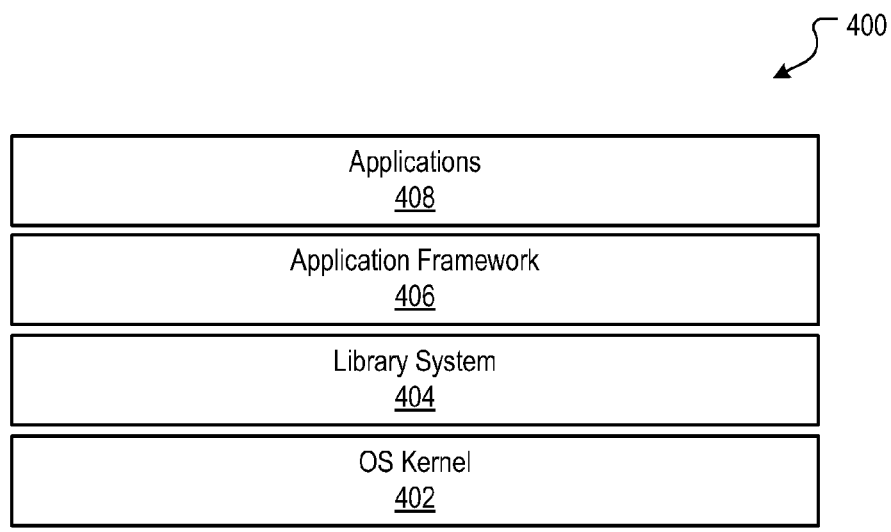
FIG. 4A illustrates an example implementation of a software stack for the mobile devices of FIGS. 1A-1B.

FIG. 4A illustrates an example implementation of a software stack 400 for the mobile devices of FIGS. 1A-1B. In some implementations, the software stack 400 includes an operating system (OS) kernel 402 (e.g., a UNIX kernel), a library system 404, an application framework 406, and an applications layer 408.

The OS kernel 402 manages the resources of the mobile device 100 or 101 and allows other programs to run and use these resources. Some examples of resources include a processor, memory, and I/O. For example, the kernel 402 can determine which running processes should be allocated to a processor, processors or processor cores, allocates memory to the processes and allocates requests from applications and remote services to perform I/O operations. In some implementations, the kernel 402 provides methods for synchronization and inter-process communications with other devices.

In some implementations, the kernel 402 can be stored in non-volatile memory of the mobile device 100 or 101. When the mobile device 100 or 101 is turned on, a boot loader starts executing the kernel 102 in supervisor mode. The kernel then initializes itself and starts one or more processes for the mobile device 100 or 101, including a security process 410 for remote access management, as described in reference to FIG. 4B.

The library system 404 provides various services for applications running in the application layer 408. Such services can include audio services, video services, database services, image processing services, graphics services, etc.

The application framework 406 provides an object-oriented application environment including classes and Application Programming Interfaces (APIs) that can be used by developers to build applications using well-known programming languages (e.g., Objective-C, Java).

The applications layer 408 is where various applications exist in the software stack 400. Developers can use the APIs and environment provided by the application framework 406 to build applications, such as the applications represented by the display objects 104, 106, shown in FIGS. 1A-1B (e.g., email, media player, Web browser, phone, music player, video player, photos, and store).

Secure Communication Channel

Figure 4B:
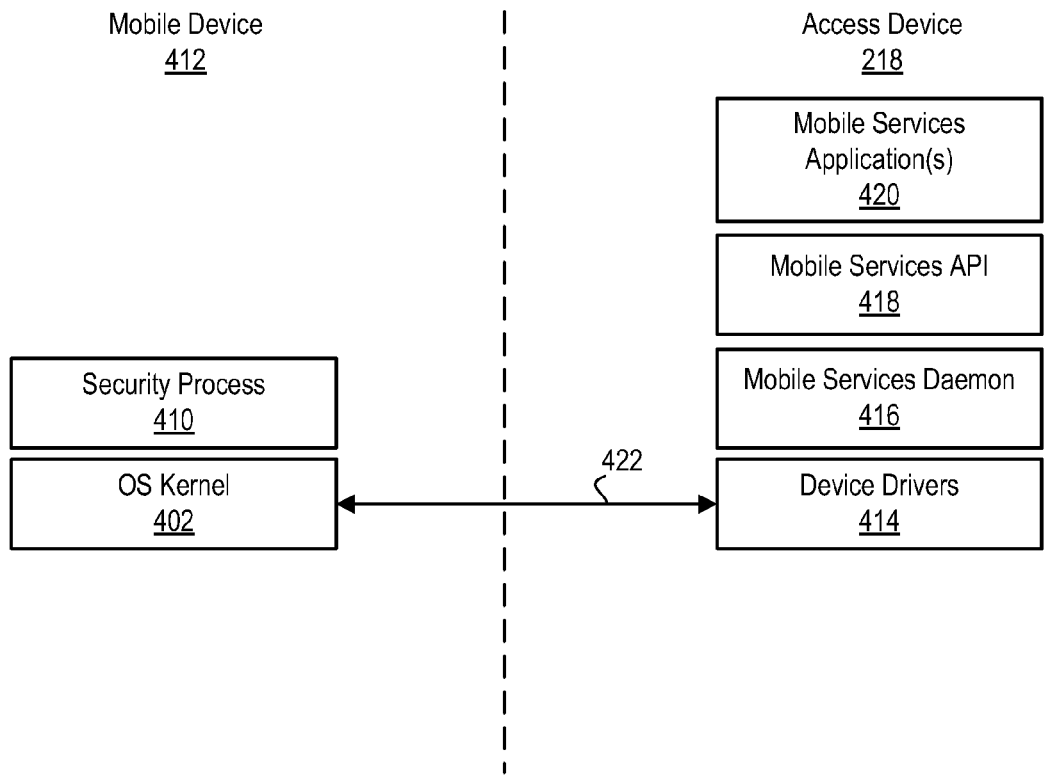
FIG. 4B illustrates an example implementation of a security process for remote access management over a secure communications channel.

FIG. 4B illustrates an example implementation of a security process 410 for remote access management over a secure communications channel 422. In the example shown, the mobile device 412, e.g., mobile device 100 or 101, is running the security process 410, which communicates with the OS kernel 402. Any remote access requests made to the kernel 402 are intercepted by the security process 410, which is responsible for setting up secure communication sessions between the mobile device 412 and a mobile services access device 218. In some implementations, the process 410 uses a cryptographic protocol, such as Secure Sockets Layer (SSL) or Transport Layer Security (TLS) to provide secure communications between the mobile device 412 and the access device 218. The access device 218 can be any device with network connectivity, including but not limited to: a personal computer, a hub, an Ethernet card, another mobile device, a wireless base station, etc. The secure communications channel can be a Universal Serial Bus (USB), Ethernet, a wireless link (e.g., Wi-Fi, WiMax, 3G), an optical link, infrared link, FireWire™, or any other known communications channel or media.

In the example shown, the access device 218 includes device drivers 414, a mobile services daemon 416, a mobile services API 418, and one or more mobile service applications 420. The device drivers 414 are responsible for implementing the transport layer protocol, such as TCP/IP over USB. The mobile services daemon 416 listens (e.g., continuously) to the communications channel 422 for activity and manages the transmission of commands and data over the communication channel 422. The mobile services API 418 provides a set of functions, procedures, variables, and data structures for supporting requests for services made by the mobile services application 420. The mobile services application 420 can be a client program running on the access device 218, which provides one or more user interfaces for allowing a user to interact with a remote service (e.g., activation service 270) over a network (e.g., the Internet, wireless network, peer-to-peer network, optical network, Ethernet, intranet). In some implementations, a device activation process can be used, as described in co-pending U.S. patent application Ser. No. 11/767,447, filed Jun. 22, 2007, for "Device Activation and Access," which patent application is incorporated by reference herein in its entirety. The application 420 can allow a user to set preferences, download or update files of content or software, search databases, store user data, select services, browse content, perform financial transactions, or engage in any other online service or function. An example of a mobile services application 420 is the iTunes™ client, which is publicly available from Apple Inc. (Cupertino, Calif.). An example of a mobile device 412 that uses the iTunes™ client is the iPod™ product developed by Apple Inc. Another example of a mobile device 412 that uses the iTunes™ client is the iPhone™ product developed by Apple Inc.

In an example operational mode, a user connects the mobile device 412 to the access device 218 using, for example, a USB cable. In other implementations, the mobile device 412 and access device 218 include wireless transceivers for establishing a wireless link (e.g., Wi-Fi). The drivers 414 and kernel 402 detect the connection and alert the security process 410 and mobile services daemon 416 of the connection status. Once the connection is established, certain non-sensitive information can be passed from the mobile device 412 to the access device 218 (e.g., name, disk size, activation state) to assist in establishing a secure communication session.

In some implementations, the security process 410 establishes a secure communication session (e.g., encrypted SSL session) with the access device 218 by implementing a secure network protocol. For example, if using SSL protocol, the mobile device 412 and access device 218 will negotiate a cipher suite to be used during data transfer, establish and share a session key, and authenticate the access device 218 to the mobile device 412. In some implementations, if the mobile device 412 is password protected, the security process 410 will not establish a session, and optionally alert the user of the reason for failure.

Once a secure session is successfully established, the mobile device 412 and the access device 218 can exchange sensitive information (e.g., passwords, personal information), and remote access to the mobile device 412 can be granted to one or more services (e.g., navigation service 230, messaging service 240, media service 250, syncing service 260, activation service 270, location service 280). In some implementations, the mobile services daemon 416 multiplexes commands and data for transmission over the communication channel 422. This multiplexing allows several remote services to have access to the mobile device 412 in a single session without the need to start a new session (or handshaking) for each service requesting access to the mobile device 412.

Example Secure Location Process

Figure 5:
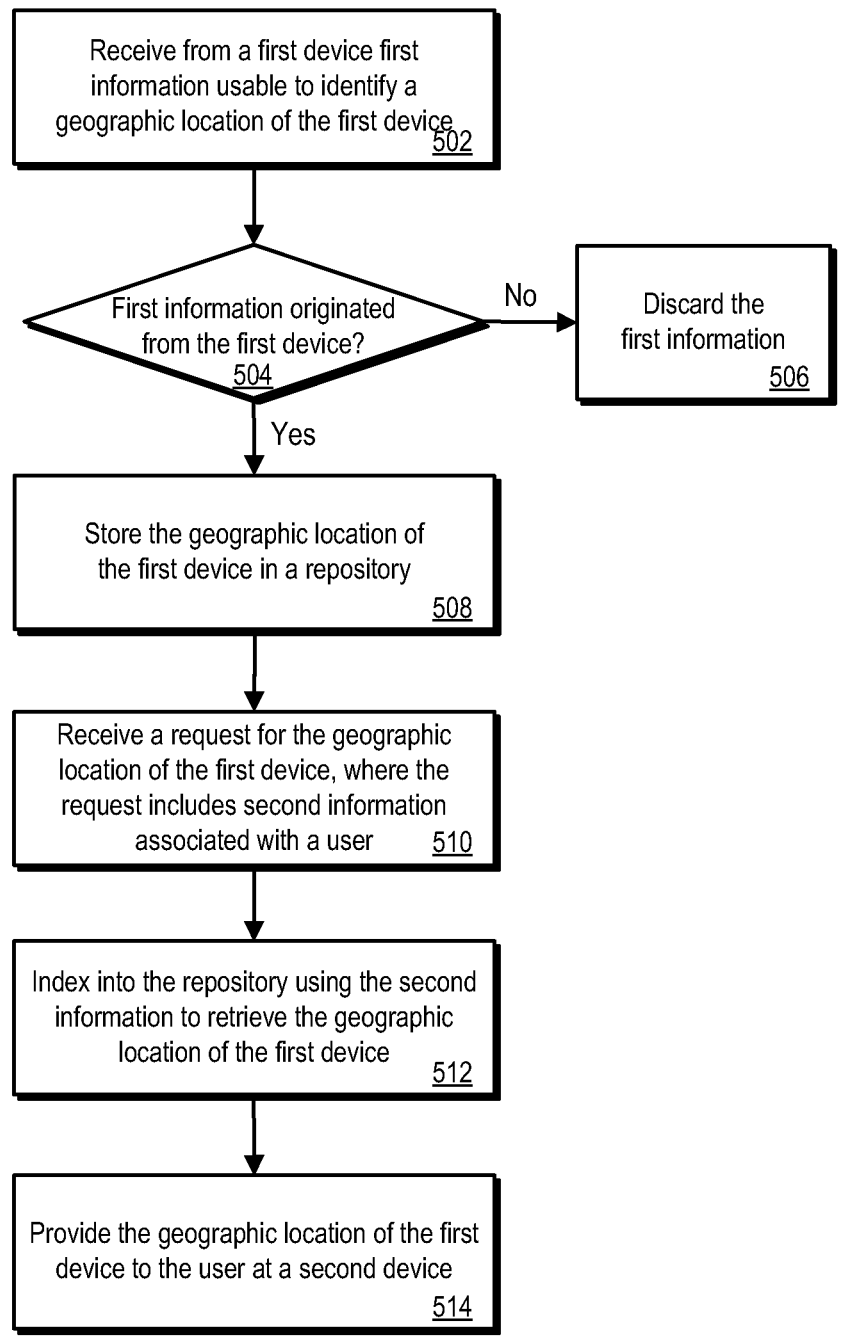
FIG. 5 is a flow diagram of an example secure location process for a device.

FIG. 5 is a flow diagram of an example secure location process 500 for a device (e.g., mobile device 100 of FIG. 1A or mobile device 101 of FIG. 1B). The process 500 can be performed when a mobile device user wishes to know where the mobile device is located. The user may have misplaced or lost the mobile device, or the mobile device may have been borrowed or stolen.

The process 500 begins by receiving first information from a first device (e.g., a mobile device), where the first information is usable to identify a geographic location of the first device (502). The first information can be received by a location service (e.g., location service 280 of FIG. 2). The geographic location of the first device can be determined or estimated from the first information, which can include information about, for example, Wi-Fi access points, television signals, cellular grids, IP addresses, or URLs. In some implementations, the first information identifies a geographic location of the first device and includes, for example, coordinates in a geographic coordinate system, e.g., latitude and longitude values based on a reference regional or world geodetic datum, such as the World Geodetic System (WGS) 84 currently used for GPS.

In some implementations, a user of the first device can activate a location transmission feature of the first device if, by default, the first device does not transmit information identifying its geographic location. For example, an owner of a mobile device (e.g., mobile device 100 of FIG. 1A) can enable the mobile device to transmit its geographic location by activating a location transmission feature when the user initially sets or updates user preferences for the mobile device, e.g., using the mobile services application 420 of FIG. 4B. In various implementations, the preference settings can include a setting for when location transmission should occur, such as periodically (e.g., on a predetermined schedule) or when triggered by certain events (e.g., when the mobile device is turned on or an update location request is received). The location transmission can occur as a background process of the mobile device, e.g., without being initiated by the user and/or without the user's awareness. In some implementations, the preference settings can include settings for enabling tracking of mobile device activity, e.g., telephone call activity and web browsing activity, as will be described in more detail below.

In some implementations, the preference settings can include settings allowing a user to specify that one or more actions (e.g., deleting data or deactivating functionality) should occur if the geographic location of the mobile device is determined to be outside a particular region or inside a particular region. For example, the user can specify that all sensitive information (e.g., financial data and personal information) stored on the mobile device is erased if a location transmission from the mobile device indicates that the mobile device is outside the user's home country or in one or more specified countries.

In some implementations, the first device transmits the first information identifying its geographic location over one or more wired or wireless networks. For example, the mobile device 202a of FIG. 2 can communicate its geographic location to a designated server of the location service 280 over the wireless network 212 (e.g., an EDGE network), the gateway 216, and the wide area network 214. In another example, the mobile device 202b of FIG. 2 can communicate its geographic location to the designated server of the location service 280 over the wide area network 214 and the access device 218, which can be coupled to the mobile device 202b through a physical connection (e.g., a USB cable) or a wireless connection (e.g., a Wi-Fi link). In some implementations, the first device can also transmit the first information through another device on a personal area network (e.g., a Bluetooth™ network).

Returning to the process 500, the first information is checked to verify that the first information originated from the first device (504). In some implementations, additional information identifying the first device can be received from the first device. In some implementations, the additional information identifying the first device is a unique serial number or identifier for the first device, e.g., an IMEI 374 stored in the mobile device memory 350 of FIG. 3. The information identifying the first device can be used to verify that the information identifying the geographic location originated from the first device.

In some implementations, an identifier for the first device and the geographic location of the first device are received from the first device in a Domain Name System (DNS) message sent using, for example, TCP/IP or UDP protocols. In particular, a mobile device (e.g., the mobile device 202b of FIG. 2) can transmit its IMEI and geographic coordinates in a DNS record (e.g., a TXT record) of a DNS message to a designated server of the location service 280. The transmission can occur when, for example, the mobile device is powered on and attempts to register on a network (e.g., a telecommunications carrier network) or with a mobile service (e.g., the mobile services application 420 of FIG. 4B). The origin of the first information identifying the geographic location can be verified as the first device identified by the identifier.

In some implementations, the first information identifying the geographic location can be transmitted by the first device as a text message that is digitally signed with a private key of the first device. For example, a mobile device (e.g., the mobile device 202a of FIG. 2) can transmit its geographic coordinates in a digitally signed SMS message to a phone number (e.g., a designated phone number) of the location service 280 over the wireless network 212 of FIG. 2. The contents of the SMS message can be signed with a private key of the mobile device, allowing the location service 280 to verify that the geographic coordinates originated from the mobile device by authenticating the digitally signed SMS message. Once the SMS message is authenticated, an identifier for the mobile device (e.g., an IMEI) can be determined, for example, based on the private key of the mobile device.

In some implementations, the first information identifying the geographic location can be transmitted by the first device as an HTTP request. For example, when a user of the mobile device is web browsing (e.g., after invoking a web browsing application by touching the Web object 114 of FIG. 1A), a web browser running on the mobile device can send an HTTP request to a designated URL (e.g., for the location service 280) with the first information identifying the mobile device's geographic location appended to the designated URL. The HTTP request can be sent as a background process and/or in parallel with a user-initiated HTTP request. In some implementations, the HTTP request to the designated URL includes an identifier for the mobile device to allow the origin of the geographic location to be verified.

If the first information fails the origin verification check ("No" branch of decision 504), the first information can be discarded (506). This may occur, for example, if the text message was not properly signed with the private key of the first device.

If the first information is verified as originating from the first device ("Yes" branch of decision 504), the geographic location of the first device can be stored in a repository (508). For example, in some implementations, the location service maintains a relational database or registry (e.g., MySQL™) of device information, including device identifiers (e.g., IMEI) and device location information (e.g., geographic coordinates). Using this database or registry, the location service knows, for example, that a particular device with a particular identifier associated with a particular user identifier had a particular geographic location at a particular time on a particular date.

A request for the geographic location of the first device is received, where the request includes second information associated with a user, where the user is associated with (e.g., the owner of or a registered user of) the first device (510). In some implementations, the second information associated with the user can be an identifier of the user. The request can be sent by the user from a host device (e.g., a personal computer) and received by a location service (e.g., location service 280 of FIG. 2). For example, after the user realizes that the user's mobile device is lost or stolen, the user can use a host device to log in using a user identifier to a mobile service application (e.g., the mobile service application 420 of FIG. 4B) to request to view the last known geographic location of the user's mobile device. In response, the mobile service application can send a request to the location service to retrieve the last known geographic location of the mobile device. In some implementations, the request includes the identifier for the first device in addition to the second information associated with the user.

If the user is associated with the first device (e.g., is the owner or a registered user of the first device), the second information associated with the user (e.g., the user identifier) can be associated in the repository with the identifier for the first device. The second information can be used to index into the repository to retrieve the geographic location of the first device in response to receiving the request (512). For example, for each user identifier, the repository can have a different entry, record, or table with stored information about the associated first device, including the geographic locations and the dates and times they were received from the first device.

In some implementations, in response to receiving the request for the last known geographic location, a second request is transmitted to the first device for an updated geographic location of the first device. For example, if the amount of time that has passed since the last known geographic location was received exceeds a predetermined threshold (e.g., 2 hours, 12 hours, 24 hours, etc.), the location service can request that the first device updates its geographic location. In some implementations, the location service requests that the first device continues to update its geographic location, for example, on a scheduled basis or when triggered by certain events. If the first device is presently powered on when the location service sends the request, the first device can transmit an updated geographic location (or information usable to identify an updated geographic location), for example, by embedding the updated geographic location in a DNS message or a text message, as described above. The updated geographic location can be received and its origin verified before the updated geographic location is stored as the last known geographic location in the repository. Alternatively, if the first device is presently powered off when the location service sends the request, the location service can abort the update request and/or reschedule the request to be sent when the first device is next powered on.

The geographic location (e.g., the last known geographic location) of the first device is provided to the user at a second device (e.g., the host device) (514). In some implementations, one or more of an address, geographic coordinates, and a map of the geographic location are provided to the user.

In some implementations, the process 500 can be performed without being requested by the first device user. For example, if both a mobile device and a user associated with the mobile device (e.g., the owner or a registered user of the mobile device) are missing, law enforcement officials can request that the process 500 be performed to determine the last known geographic location of the missing mobile device in the hope of also finding the user associated with the missing mobile device.

Example Device Location Function

Figure 6A:
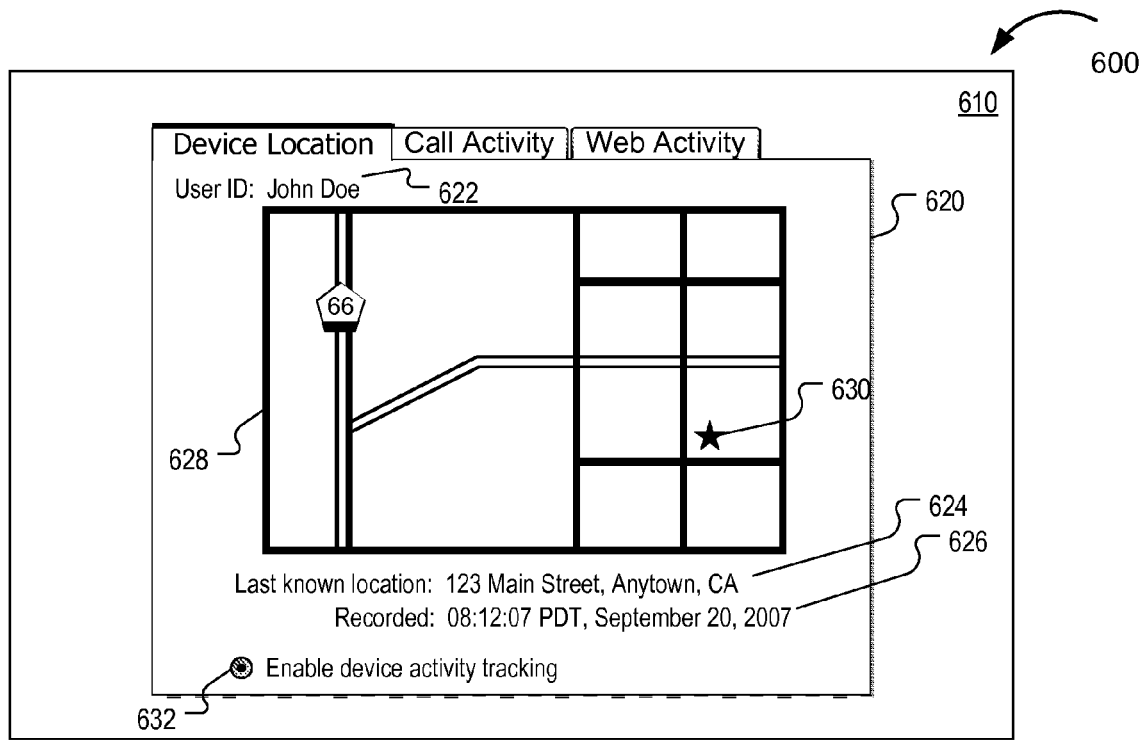
FIG. 6A illustrates an example of providing a geographic location of the mobile device of FIG. 1A to a user at a host device.

FIG. 6A illustrates an example 600 of providing a geographic location of the mobile device of FIG. 1A to a user at a host device. The example 600 illustrates a device location interface 620 displayed on a screen 610 of a display device, which can be part of or coupled to a host device. In some implementations, the user can access the device location interface 620 through the mobile service application 420 of FIG. 4B. The device location interface 620 includes the identifier 622 of the user associated with the missing mobile device. The device location interface 620 can include the last known geographic location of the mobile device as an address 624 with a date and time 626 indicating when the last known geographic location was received from the mobile device. In some implementations, the device location interface 620 includes a map 628 with the last known geographic location of the mobile device indicated on the map 628, e.g., as a star 630 on the map 628. Alternatively or in addition, the device location interface 620 can display the last known geographic location of the mobile device as geographic coordinates (e.g., latitude and longitude values). The last known geographic location can help the user recover the mobile device, e.g., by retrieving the mobile device if it was simply lost or misplaced, or by contacting law enforcement officials to help recover the mobile device if it was stolen.

In some implementations, the device location interface 620 includes a selectable user interface element (e.g., button 632) that allows the user to enable activity tracking on the mobile device. The user may wish to enable activity tracking if the user suspects that the missing mobile device is being used by someone (e.g., a person who found, borrowed, or stole the mobile device). For example, information gained by enabling activity tracking may be used by law enforcement officials to help determine the identity of the person who presently has the mobile device.

User selection of the activity tracking element can trigger the location service (e.g., the location service 280 of FIG. 2) to send a request to the mobile device to begin tracking device activity and sending information about the activity to the location service. For example, the location service 280 can send a message (e.g., as a remote access request) to the security process 410 running on the mobile device 412 of FIG. 4B to begin monitoring one or more applications residing on the applications layer 408 of the mobile device software stack 400 of FIG. 4A. Information about applications activity (e.g., information about phone calls, web browsing, e-mails, etc.) can be gathered by the mobile device and sent to the location service to be provided to the user.

Example Call Activity Function

Figure 6B:
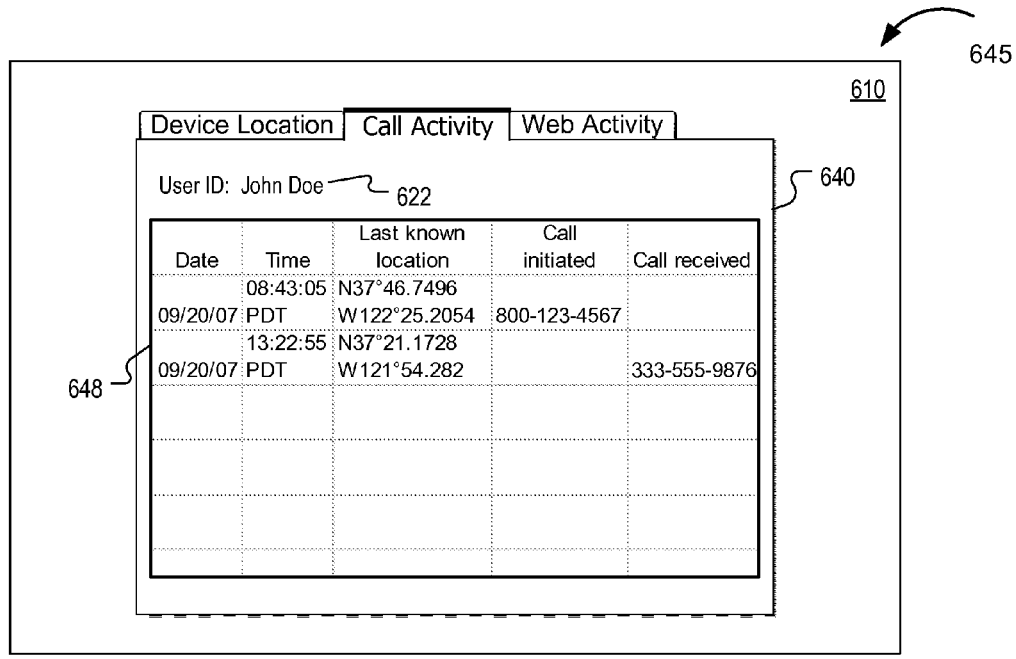
FIG. 6B illustrates an example of providing a record of call activity of the mobile device of FIG. 1A to a user at a host device.

FIG. 6B illustrates an example 645 of providing a record of call activity 648 of the mobile device of FIG. 1A to a user at a host device. The record of call activity 648 can be presented to a user in response to the user enabling device activity tracking (e.g., by selecting the button 632 of FIG. 6A) and the location service receiving telephone call activity information from the mobile device.

The example 645 illustrates a call activity interface 640 displayed on the screen 610 of the display device of the host device. In some implementations, the user can access the call activity interface 640 through the mobile service application 420 of FIG. 4B. The call activity interface 640 includes the user identifier 622 and the record of call activity 648. The record of call activity 648 can include a log of calls initiated by the mobile device, a log of calls received by the mobile device, the dates and times of the calls, and the mobile device's last known geographic locations at the times of the calls. In some implementations, the record of call activity 648 includes other information, such as call durations. The last known geographic locations can be displayed, for example, as addresses or geographic coordinates. In some implementations, the last known geographic locations are presented as selectable links which, when selected, can trigger the display of a map with the selected location indicated, such as the map 628 of FIG. 6A. The record of initiated and received calls may be used by law enforcement officials to help determine the identity of the person who presently has the mobile device.

Example Web Activity Function

Figure 6C:
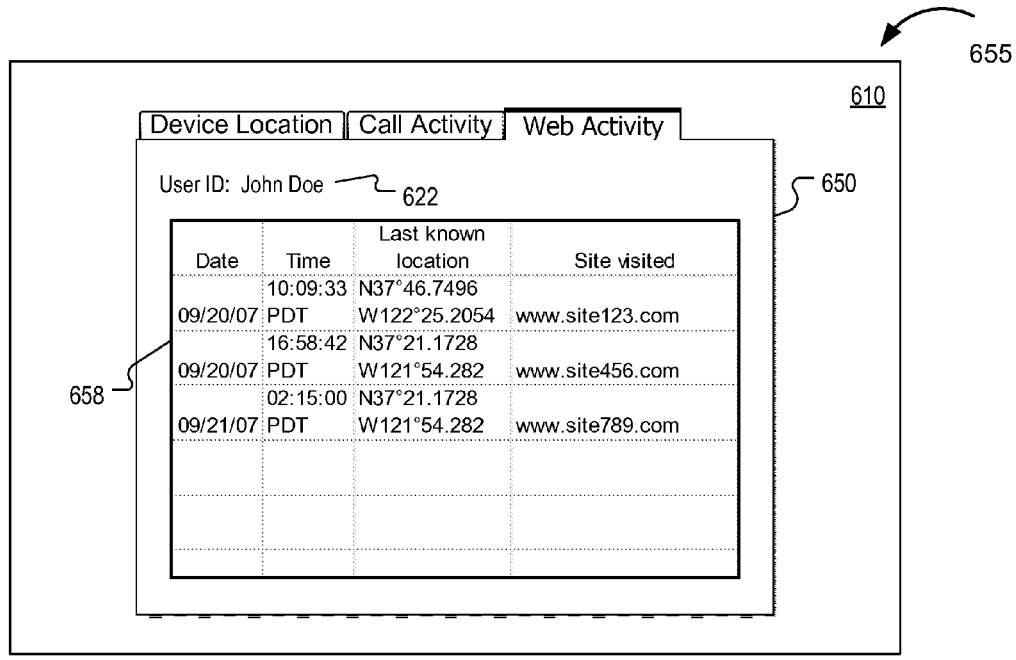
FIG. 6C illustrates an example of providing a record of web browsing activity of the mobile device of FIG. 1A to a user at a host device.

FIG. 6C illustrates an example 655 of providing a record of web browsing activity 658 of the mobile device of FIG. 1A to a user at a host device. The record of web browsing activity 658 can be presented to a user in response to the user enabling device activity tracking (e.g., by selecting the button 632 of FIG. 6A) and the location service receiving web browsing activity information from the mobile device.

The example 655 illustrates a web activity interface 650 displayed on the screen 610. In some implementations, the user can access the web activity interface 650 through the mobile service application 420 of FIG. 4B. The web activity interface 650 includes the user identifier 622 and the record of web browsing activity 658. The record of web browsing activity 658 can include a log of addresses for the web sites visited, the dates and times of the site visits, and the mobile device's last known geographic locations at the times of the site visits. In some implementations, the web site addresses are displayed as URLs or IP addresses. In some implementations, the record of web browsing activity 658 includes other information. The last known geographic locations can be displayed as addresses or geographic coordinates. In some implementations, selection of one of the displayed last known geographic locations can trigger the display of a map with the selected location indicated, such as the map 628 of FIG. 6A.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
receiving, by a host device and from a user of a mobile device, a request to locate the mobile device;
in response, remotely activating, by the host device, a function of the mobile device to record a last known location of the mobile device and submit the recorded location to the host device; and
displaying, on a display device coupled to the host device, an identifier of the user of the mobile device and a first user selectable tab for displaying a device location on a map, a second user selectable tab for displaying a call activity log, and a third user selectable tab for displaying a web activity log, wherein:
the call activity log comprises one or more call activity records arranged in a table format, each call activity record includes representations of a date of a call, a time of the call, a duration of the call, and a last known location at the time of the call,
the web activity log comprises one or more web activity records arranged in the table format, each web activity record includes representations of a date of a web activity, a time of the web activity, and a last known location at the time of the web activity,
each of the last location at the time of the call and the last location at the time of the web activity is presented as a selectable link that, when selected, triggers the host device to switch from the second user selectable tab or from the third user selectable tab to the first user selectable tab to display the map, wherein the selected last location is marked in the displayed map, and
the map is displayed in association with a user interface item for remotely activating a security procedure of the mobile device.

2. The method of claim 1, wherein:
the security procedure comprises functions of recording an attribute of a user activity performed on the mobile device,
the user activity includes at least one of a telephone call activity, a web browsing activity, or an e-mail activity, and
the attribute includes a telephone number, a web address, or an e-mail address.

3. The method of claim 2, wherein:
each call activity record includes a destination phone number when the call is initiated from the mobile device or a source phone number when the call is received by the mobile device, and
each web activity record includes a record of a web site visited.

4. The method of claim 3, where the last known location includes geographic coordinates of the mobile device, the coordinates being incorporated in a domain name system (DNS) record as a part of a DNS message transmitted from the mobile device.

5. The method of claim 4, where the geographic coordinates of the last known location of the mobile device is incorporated in a text record of the DNS message.

6. The method of claim 5, where the text record is a TXT record of the DNS message.

7. The method of claim 3, wherein:
each last known location is included in a text message that is digitally signed with a private key of the mobile device.

8. The method of claim 1, comprising:
providing, by the host device and to the mobile device, a request to update the last known location of the mobile device upon determining that a pre-determined amount of time has passed since the host device received the location.

9. A non-transitory computer-readable medium having instructions stored thereon, the instructions operable to cause a processor to perform operations comprising:
receiving, by a host device and from a user of a mobile device, a request to locate the mobile device;
in response, remotely activating, by the host device, a function of the mobile device to record a last known location of the mobile device and submit the recorded location to the host device; and
displaying, on a display device coupled to the host device, an identifier of the user of the mobile device and a first user selectable tab for displaying a device location on a map, a second user selectable tab for displaying a call activity log, and a third user selectable tab for displaying a web activity log, wherein:

the call activity log comprises one or more call activity records arranged in a table format, each call activity record includes representations of a date of a call, a time of the call, a duration of the call, and a last known location at the time of the call, the web activity log comprises one or more web activity records arranged in the table format, each web activity record includes representations of a date of a web activity, a time of the web activity, and a last known location at the time of the web activity, each of the last location at the time of the call and the last location at the time of the web activity is presented as a selectable link that, when selected, triggers the host device to switch from the second user selectable tab or from the third user selectable tab to the first user selectable tab to display the map, wherein the selected last location is marked in the displayed map, and the map is displayed in association with a user interface item for remotely activating a security procedure of the mobile device.

10. The non-transitory computer-readable medium of claim 9, wherein:

the security procedure comprises functions of recording an attribute of a user activity performed on the mobile device, the activity includes at least one of a telephone call activity, a web browsing activity, or an e-mail activity, and the attribute includes a telephone number, a web address, or an e-mail address.

11. The non-transitory computer-readable medium of claim 10, wherein:

each call activity record includes a destination phone number when the call is initiated from the mobile device or a source phone number when the call is received by the mobile device, and each web activity record includes a record of a web site visited.

12. The non-transitory computer-readable medium of claim 11, where the last known location includes geographic coordinates of the mobile device, the coordinates being incorporated in a domain name system (DNS) record as a part of a DNS message transmitted from the mobile device.

13. The non-transitory computer-readable medium of claim 12, where the geographic coordinates of the last known location of the mobile device is incorporated in a text record of the DNS message.

14. The non-transitory computer-readable medium of claim 13, where the text record is a TXT record of the DNS message.

15. The non-transitory computer-readable medium of claim 11, wherein:

each last known location is included in a text message that is digitally signed with a private key of the mobile device; and the operations comprise authenticating the digitally signed text message.

16. The non-transitory computer-readable medium of claim 9, the operations comprising:

providing, by the host device and to the mobile device, a request to update the last known location of the mobile device upon determining that a pre-determined amount of time has passed since the host device received the location.

17. A system, comprising:
a host device including a processor; and
a non-transitory computer-readable medium coupled to the processor and including instructions, which, when executed by the processor, cause the processor to perform operations comprising:

receiving, by a host device and from a user of a mobile device, a request to locate the mobile device;

in response, remotely activating, by the host device, a function of the mobile device to record a last known location of the mobile device and submit the recorded location to the host device; and displaying, on a display device coupled to the host device, an identifier of the user of the mobile device and a first user selectable tab for displaying a device location on a map, a second user selectable tab for displaying a call activity log, and a third user selectable tab for displaying a web activity log, wherein:

the call activity log comprises one or more call activity records arranged in a table format, each call activity record includes representations of a date of a call, a time of the call, a duration of the call, and a last known location at the time of the call, the web activity log comprises one or more web activity records arranged in the table format, each web activity record includes representations of a date of a web activity, a time of the web activity, and a last known location at the time of the web activity, each of the last location at the time of the call and the last location at the time of the web activity is presented as a selectable link that, when selected, triggers the host device to switch from the second user selectable tab or from the third user selectable tab to the first user selectable tab to display the map, wherein the selected last location is marked in the displayed map, and the map is displayed in association with a user interface item for remotely activating a security procedure of the mobile device.

18. The system of claim 17, wherein:
the security procedure comprises functions of recording an attribute of a user activity performed on the mobile device,
the activity includes at least one of a telephone call activity, a web browsing activity, or an e-mail activity, and
the attribute includes a telephone number, a web address, or an e-mail address.

19. The system of claim 18, wherein:
each call activity record includes a destination phone number when the call is initiated from the mobile device or a source phone number when the call is received by the mobile device, and
each web activity record includes a record of a web site visited.

20. The system of claim 19, where the last known location includes geographic coordinates of the mobile device, the coordinates being incorporated in a domain name system (DNS) record as a part of a DNS message transmitted from the mobile device.

21. The system of claim 20, where the geographic coordinates of the last known location of the mobile device is incorporated in a text record of the DNS message.

22. The system of claim 21, where the text record is a TXT record of the DNS message.

23. The system of claim 19, wherein:
each last known location is included in a text message that is digitally signed with a private key of the mobile device; and the operations comprise authenticating the digitally signed text message.

24. The system of claim 17, the operations comprising:
providing, by the host device and to the mobile device, a request to update the last known location of the mobile device upon determining that a pre-determined amount of time has passed since the host device received the location.

25. The system of claim 17, comprising:
determining, by the security procedure of the mobile device, that the mobile device is located outside of a designated country, wherein the designated country is a home country of a user of the mobile device.

26. The system of claim 25, comprising:
in response to determining that the mobile device is located outside of the designated country, erasing designated sensitive information from a storage device of the mobile device, wherein the designated sensitive information includes financial data and a password.

* * * * *